United States Patent
Nakamura et al.

(10) Patent No.: US 9,971,193 B2
(45) Date of Patent: May 15, 2018

(54) LIQUID CRYSTAL DISPLAY PANEL

(71) Applicant: Sharp Kabushiki Kaisha, Sakai, Osaka (JP)

(72) Inventors: Kohzoh Nakamura, Sakai (JP); Akira Sakai, Sakai (JP); Kiyoshi Minoura, Sakai (JP)

(73) Assignee: Sharp Kabushiki Kaisha, Sakai (JP)

(*) Notice: Subject to any disclaimer, the term of this patent is extended or adjusted under 35 U.S.C. 154(b) by 0 days. days.

(21) Appl. No.: 15/508,510

(22) PCT Filed: Sep. 2, 2015

(86) PCT No.: PCT/JP2015/074926
§ 371 (c)(1),
(2) Date: Mar. 3, 2017

(87) PCT Pub. No.: WO2016/035811
PCT Pub. Date: Mar. 10, 2016

(65) Prior Publication Data
US 2017/0285399 A1  Oct. 5, 2017

(30) Foreign Application Priority Data
Sep. 5, 2014 (JP) ................. 2014-181565

(51) Int. Cl.
G02F 1/1335 (2006.01)
G02F 1/1343 (2006.01)
G02F 1/137 (2006.01)

(52) U.S. Cl.
CPC ........ *G02F 1/133528* (2013.01); *G02F 1/137* (2013.01); *G02F 1/134363* (2013.01);
(Continued)

(58) Field of Classification Search
None
See application file for complete search history.

(56) References Cited

U.S. PATENT DOCUMENTS

2003/0202140 A1* 10/2003 Liu .................. G02F 1/133528
349/117
2007/0222927 A1  9/2007 Uehara et al.
(Continued)

FOREIGN PATENT DOCUMENTS

JP  2005-055709 A  3/2005
JP  2012-134475 A  7/2012
(Continued)

OTHER PUBLICATIONS

Official Communication issued in International Patent Application No. PCT/JP2015/074926, dated Nov. 17, 2015.
Sakai et al., U.S. Appl. No. 15/739,698, filed Dec. 22, 2017.

*Primary Examiner* — James Dudek
(74) *Attorney, Agent, or Firm* — Keating & Bennett, LLP

(57) ABSTRACT

A liquid crystal display panel (100A, 100B) includes a transverse electric field mode liquid crystal cell (10), a first polarizing plate (22A, 22B) disposed on a back surface side of the liquid crystal cell (10), and a second polarizing plate (24A, 24B) disposed on a viewer's side of the liquid crystal cell (10). A liquid crystal layer (18) contains a nematic liquid crystal whose dielectric anisotropy is negative. The liquid crystal layer (18) has $\Delta nd$ of less than 550 nm, where $\Delta n$ is the birefringent index of the nematic liquid crystal and d is the thickness of the liquid crystal layer. The liquid crystal layer (18) is in a twist alignment state when no voltage is applied. When polarized light whose Stokes parameter S3 takes on an absolute value |S3| of 1.00 enters the liquid crystal layer (18), |S3| of polarized light having perpendicularly passed through the liquid crystal layer (18) is 0.85 or greater. The first polarizing plate (22A, 22B) and the second polarizing plate (24A, 24B) are circularly polarizing plates or elliptically polarizing plates whose ellipticity is 0.422 or greater.

5 Claims, 12 Drawing Sheets

(52) U.S. Cl.
CPC ............ *G02F 2001/13712* (2013.01); *G02F 2001/134372* (2013.01)

(56) References Cited

U.S. PATENT DOCUMENTS

| | | |
|---|---|---|
| 2012/0138922 A1 | 6/2012 | Yamazaki et al. |
| 2012/0218497 A1 | 8/2012 | Kajita |
| 2013/0320334 A1 | 12/2013 | Yamazaki et al. |
| 2014/0286076 A1 | 9/2014 | Aoki et al. |
| 2017/0285399 A1 | 10/2017 | Nakamura et al. |

FOREIGN PATENT DOCUMENTS

| | | |
|---|---|---|
| JP | 2012-173672 A | 9/2012 |
| JP | 5278720 B2 | 9/2013 |
| JP | 2014-007399 A | 1/2014 |
| JP | 2014-209727 A | 11/2014 |
| WO | 2016/035811 A1 | 3/2016 |

* cited by examiner (a)

TWIST ANGLE (deg.)

| Δnd of Liquid Crystal Layer (nm) | 0 | 10 | 20 | 30 | 40 | 50 | 60 | 70 | 80 | 90 |
|---|---|---|---|---|---|---|---|---|---|---|
| 600 | 0.84 | 0.84 | 0.82 | 0.80 | 0.77 | 0.72 | 0.67 | 0.60 | 0.52 | 0.43 |
| 595 | 0.87 | 0.87 | 0.85 | 0.83 | 0.80 | 0.76 | 0.70 | 0.64 | 0.56 | 0.47 |
| 590 | 0.90 | 0.89 | 0.88 | 0.86 | 0.83 | 0.79 | 0.74 | 0.68 | 0.60 | 0.51 |
| 585 | 0.92 | 0.92 | 0.91 | 0.89 | 0.86 | 0.82 | 0.77 | 0.71 | 0.64 | 0.55 |
| 580 | 0.94 | 0.94 | 0.93 | 0.91 | 0.89 | 0.85 | 0.81 | 0.75 | 0.67 | 0.59 |
| 575 | 0.96 | 0.96 | 0.95 | 0.93 | 0.91 | 0.88 | 0.84 | 0.78 | 0.71 | 0.63 |
| 570 | 0.97 | 0.97 | 0.97 | 0.95 | 0.93 | 0.90 | 0.86 | 0.81 | 0.74 | 0.66 |
| 565 | 0.99 | 0.98 | 0.98 | 0.97 | 0.95 | 0.93 | 0.89 | 0.84 | 0.77 | 0.70 |
| 560 | 0.99 | 0.99 | 0.99 | 0.98 | 0.97 | 0.94 | 0.91 | 0.86 | 0.80 | 0.73 |
| 555 | 1.00 | 1.00 | 1.00 | 0.99 | 0.98 | 0.96 | 0.93 | 0.89 | 0.83 | 0.76 |
| 550 | 1.00 | 1.00 | 1.00 | 1.00 | 0.99 | 0.97 | 0.95 | 0.91 | 0.86 | 0.79 |
| 545 | 1.00 | 1.00 | 1.00 | 1.00 | 0.99 | 0.98 | 0.96 | 0.93 | 0.88 | 0.82 |
| 540 | 0.99 | 0.99 | 1.00 | 1.00 | 1.00 | 0.99 | 0.98 | 0.95 | 0.90 | 0.84 |
| 535 | 0.99 | 0.99 | 0.99 | 1.00 | 1.00 | 1.00 | 0.99 | 0.96 | 0.92 | 0.87 |
| 530 | 0.97 | 0.98 | 0.98 | 0.99 | 1.00 | 1.00 | 0.99 | 0.97 | 0.94 | 0.89 |
| 525 | 0.96 | 0.96 | 0.97 | 0.98 | 0.99 | 1.00 | 1.00 | 0.98 | 0.95 | 0.91 |
| 520 | 0.94 | 0.95 | 0.96 | 0.97 | 0.98 | 1.00 | 1.00 | 0.99 | 0.97 | 0.93 |
| 515 | 0.92 | 0.93 | 0.94 | 0.95 | 0.97 | 0.99 | 1.00 | 1.00 | 0.98 | 0.94 |
| 510 | 0.90 | 0.90 | 0.92 | 0.94 | 0.96 | 0.98 | 1.00 | 1.00 | 0.99 | 0.96 |
| 505 | 0.87 | 0.88 | 0.89 | 0.92 | 0.94 | 0.97 | 0.99 | 1.00 | 0.99 | 0.97 |
| 500 | 0.84 | 0.85 | 0.87 | 0.89 | 0.92 | 0.96 | 0.98 | 1.00 | 1.00 | 0.98 |
| 495 | 0.81 | 0.82 | 0.84 | 0.87 | 0.90 | 0.94 | 0.97 | 0.99 | 1.00 | 0.99 |
| 490 | 0.77 | 0.78 | 0.80 | 0.84 | 0.88 | 0.92 | 0.96 | 0.99 | 1.00 | 0.99 |
| 485 | 0.74 | 0.75 | 0.77 | 0.81 | 0.85 | 0.90 | 0.94 | 0.98 | 1.00 | 1.00 |
| 480 | 0.70 | 0.71 | 0.73 | 0.77 | 0.82 | 0.88 | 0.93 | 0.97 | 0.99 | 1.00 |
| 475 | 0.65 | 0.66 | 0.69 | 0.74 | 0.79 | 0.85 | 0.91 | 0.95 | 0.99 | 1.00 |
| 470 | 0.61 | 0.62 | 0.65 | 0.70 | 0.76 | 0.82 | 0.89 | 0.94 | 0.98 | 1.00 |
| 465 | 0.56 | 0.58 | 0.61 | 0.66 | 0.72 | 0.79 | 0.86 | 0.92 | 0.97 | 1.00 |
| 460 | 0.52 | 0.53 | 0.56 | 0.62 | 0.69 | 0.76 | 0.84 | 0.90 | 0.96 | 0.99 |
| 455 | 0.47 | 0.48 | 0.52 | 0.57 | 0.65 | 0.73 | 0.81 | 0.88 | 0.94 | 0.98 |
| 450 | 0.42 | 0.43 | 0.47 | 0.53 | 0.61 | 0.69 | 0.78 | 0.86 | 0.93 | 0.98 |
| 445 | 0.36 | 0.38 | 0.42 | 0.48 | 0.56 | 0.66 | 0.75 | 0.84 | 0.91 | 0.97 |
| 440 | 0.31 | 0.32 | 0.37 | 0.43 | 0.52 | 0.62 | 0.72 | 0.81 | 0.89 | 0.96 |
| 435 | 0.25 | 0.27 | 0.31 | 0.39 | 0.48 | 0.58 | 0.69 | 0.79 | 0.87 | 0.94 |
| 430 | 0.20 | 0.21 | 0.26 | 0.34 | 0.43 | 0.54 | 0.65 | 0.76 | 0.85 | 0.93 |
| 425 | 0.14 | 0.16 | 0.21 | 0.28 | 0.38 | 0.50 | 0.62 | 0.73 | 0.83 | 0.91 |
| 420 | 0.09 | 0.10 | 0.15 | 0.23 | 0.34 | 0.46 | 0.58 | 0.70 | 0.81 | 0.90 |
| 415 | 0.03 | 0.05 | 0.10 | 0.18 | 0.29 | 0.41 | 0.54 | 0.67 | 0.78 | 0.88 |
| 410 | -0.03 | -0.01 | 0.04 | 0.13 | 0.24 | 0.37 | 0.51 | 0.64 | 0.76 | 0.86 |
| 405 | -0.09 | -0.07 | -0.01 | 0.08 | 0.19 | 0.33 | 0.47 | 0.61 | 0.73 | 0.84 |
| 400 | -0.14 | -0.12 | -0.06 | 0.03 | 0.15 | 0.28 | 0.43 | 0.57 | 0.71 | 0.82 |
| 395 | -0.20 | -0.18 | -0.12 | -0.02 | 0.10 | 0.24 | 0.39 | 0.54 | 0.68 | 0.80 |
| 390 | -0.25 | -0.23 | -0.17 | -0.08 | 0.05 | 0.20 | 0.35 | 0.51 | 0.65 | 0.78 |
| 385 | -0.31 | -0.29 | -0.23 | -0.13 | 0.00 | 0.15 | 0.31 | 0.48 | 0.63 | 0.76 |
| 380 | -0.36 | -0.34 | -0.28 | -0.18 | -0.04 | 0.11 | 0.28 | 0.44 | 0.60 | 0.74 |
| 375 | -0.42 | -0.39 | -0.33 | -0.22 | -0.09 | 0.07 | 0.24 | 0.41 | 0.57 | 0.72 |
| 370 | -0.47 | -0.44 | -0.38 | -0.27 | -0.13 | 0.03 | 0.20 | 0.38 | 0.54 | 0.69 |
| 365 | -0.52 | -0.49 | -0.43 | -0.32 | -0.18 | -0.01 | 0.16 | 0.35 | 0.52 | 0.67 |
| 360 | -0.56 | -0.54 | -0.47 | -0.36 | -0.22 | -0.05 | 0.13 | 0.31 | 0.49 | 0.65 |
| 355 | -0.61 | -0.59 | -0.52 | -0.41 | -0.26 | -0.09 | 0.09 | 0.28 | 0.46 | 0.63 |
| 350 | -0.65 | -0.63 | -0.56 | -0.45 | -0.30 | -0.13 | 0.06 | 0.25 | 0.44 | 0.61 |
| 345 | -0.70 | -0.67 | -0.60 | -0.49 | -0.34 | -0.16 | 0.03 | 0.22 | 0.41 | 0.59 |
| 340 | -0.74 | -0.71 | -0.64 | -0.53 | -0.37 | -0.20 | 0.00 | 0.20 | 0.39 | 0.56 |
| 335 | -0.77 | -0.75 | -0.68 | -0.56 | -0.41 | -0.23 | -0.03 | 0.17 | 0.36 | 0.54 |
| 330 | -0.81 | -0.78 | -0.71 | -0.59 | -0.44 | -0.26 | -0.06 | 0.14 | 0.34 | 0.52 |
| 325 | -0.84 | -0.82 | -0.74 | -0.63 | -0.47 | -0.29 | -0.09 | 0.12 | 0.32 | 0.51 |
| 320 | -0.87 | -0.85 | -0.77 | -0.65 | -0.50 | -0.31 | -0.11 | 0.09 | 0.30 | 0.49 |
| 315 | -0.90 | -0.87 | -0.80 | -0.68 | -0.52 | -0.34 | -0.14 | 0.07 | 0.28 | 0.47 |
| 310 | -0.92 | -0.90 | -0.82 | -0.70 | -0.55 | -0.36 | -0.16 | 0.05 | 0.26 | 0.45 |

FIG. 4B

| Δnd OF LIQUID CRYSTAL LAYER (nm) \ TWIST ANGLE (deg.) | 100 | 110 | 120 | 130 | 140 | 150 | 160 | 170 | 180 |
|---|---|---|---|---|---|---|---|---|---|
| 600 | 0.33 | 0.24 | 0.14 | 0.06 | -0.02 | -0.07 | -0.10 | -0.11 | -0.08 |
| 595 | 0.38 | 0.28 | 0.18 | 0.09 | 0.01 | -0.04 | -0.08 | -0.09 | -0.07 |
| 590 | 0.42 | 0.32 | 0.22 | 0.13 | 0.05 | -0.02 | -0.06 | -0.07 | -0.06 |
| 585 | 0.46 | 0.36 | 0.26 | 0.16 | 0.08 | 0.01 | -0.03 | -0.05 | -0.04 |
| 580 | 0.50 | 0.40 | 0.30 | 0.20 | 0.11 | 0.04 | -0.01 | -0.03 | -0.03 |
| 575 | 0.53 | 0.44 | 0.33 | 0.24 | 0.15 | 0.07 | 0.02 | -0.01 | -0.02 |
| 570 | 0.57 | 0.47 | 0.37 | 0.27 | 0.18 | 0.10 | 0.04 | 0.01 | 0.00 |
| 565 | 0.61 | 0.51 | 0.41 | 0.31 | 0.21 | 0.13 | 0.07 | 0.03 | 0.02 |
| 560 | 0.64 | 0.55 | 0.44 | 0.34 | 0.25 | 0.16 | 0.09 | 0.05 | 0.03 |
| 555 | 0.68 | 0.58 | 0.48 | 0.38 | 0.28 | 0.19 | 0.12 | 0.07 | 0.05 |
| 550 | 0.71 | 0.61 | 0.51 | 0.41 | 0.31 | 0.22 | 0.15 | 0.10 | 0.07 |
| 545 | 0.74 | 0.65 | 0.55 | 0.44 | 0.34 | 0.25 | 0.18 | 0.12 | 0.09 |
| 540 | 0.77 | 0.68 | 0.58 | 0.48 | 0.38 | 0.28 | 0.20 | 0.14 | 0.11 |
| 535 | 0.79 | 0.71 | 0.61 | 0.51 | 0.41 | 0.31 | 0.23 | 0.17 | 0.13 |
| 530 | 0.82 | 0.74 | 0.64 | 0.54 | 0.44 | 0.34 | 0.26 | 0.19 | 0.15 |
| 525 | 0.84 | 0.77 | 0.67 | 0.57 | 0.47 | 0.37 | 0.29 | 0.22 | 0.17 |
| 520 | 0.87 | 0.79 | 0.70 | 0.60 | 0.50 | 0.40 | 0.31 | 0.24 | 0.19 |
| 515 | 0.89 | 0.82 | 0.73 | 0.63 | 0.53 | 0.43 | 0.34 | 0.27 | 0.21 |
| 510 | 0.91 | 0.84 | 0.75 | 0.66 | 0.56 | 0.46 | 0.37 | 0.29 | 0.23 |
| 505 | 0.92 | 0.86 | 0.78 | 0.69 | 0.59 | 0.49 | 0.39 | 0.31 | 0.26 |
| 500 | 0.94 | 0.88 | 0.80 | 0.71 | 0.61 | 0.51 | 0.42 | 0.34 | 0.28 |
| 495 | 0.95 | 0.90 | 0.82 | 0.74 | 0.64 | 0.54 | 0.45 | 0.36 | 0.30 |
| 490 | 0.96 | 0.92 | 0.85 | 0.76 | 0.67 | 0.57 | 0.47 | 0.39 | 0.32 |
| 485 | 0.97 | 0.93 | 0.87 | 0.78 | 0.69 | 0.59 | 0.50 | 0.41 | 0.34 |
| 480 | 0.98 | 0.94 | 0.88 | 0.81 | 0.71 | 0.62 | 0.52 | 0.44 | 0.37 |
| 475 | 0.99 | 0.96 | 0.90 | 0.83 | 0.74 | 0.64 | 0.55 | 0.46 | 0.39 |
| 470 | 0.99 | 0.97 | 0.92 | 0.84 | 0.76 | 0.67 | 0.57 | 0.48 | 0.41 |
| 465 | 1.00 | 0.98 | 0.93 | 0.86 | 0.78 | 0.69 | 0.59 | 0.51 | 0.43 |
| 460 | 1.00 | 0.98 | 0.94 | 0.88 | 0.80 | 0.71 | 0.62 | 0.53 | 0.45 |
| 455 | 1.00 | 0.99 | 0.95 | 0.90 | 0.82 | 0.73 | 0.64 | 0.55 | 0.47 |
| 450 | 1.00 | 0.99 | 0.96 | 0.91 | 0.84 | 0.75 | 0.66 | 0.57 | 0.49 |
| 445 | 1.00 | 1.00 | 0.97 | 0.92 | 0.85 | 0.77 | 0.68 | 0.59 | 0.51 |
| 440 | 0.99 | 1.00 | 0.98 | 0.94 | 0.87 | 0.79 | 0.70 | 0.61 | 0.54 |
| 435 | 0.99 | 1.00 | 0.99 | 0.95 | 0.88 | 0.81 | 0.72 | 0.63 | 0.56 |
| 430 | 0.98 | 1.00 | 0.99 | 0.96 | 0.90 | 0.82 | 0.74 | 0.65 | 0.57 |
| 425 | 0.97 | 1.00 | 1.00 | 0.97 | 0.91 | 0.84 | 0.76 | 0.67 | 0.59 |
| 420 | 0.96 | 0.99 | 1.00 | 0.97 | 0.92 | 0.86 | 0.78 | 0.69 | 0.61 |
| 415 | 0.95 | 0.99 | 1.00 | 0.98 | 0.93 | 0.87 | 0.79 | 0.71 | 0.63 |
| 410 | 0.94 | 0.98 | 1.00 | 0.99 | 0.94 | 0.88 | 0.81 | 0.73 | 0.65 |
| 405 | 0.93 | 0.98 | 1.00 | 0.99 | 0.95 | 0.90 | 0.82 | 0.74 | 0.67 |
| 400 | 0.91 | 0.97 | 1.00 | 0.99 | 0.96 | 0.91 | 0.84 | 0.76 | 0.68 |
| 395 | 0.90 | 0.96 | 1.00 | 1.00 | 0.97 | 0.92 | 0.85 | 0.78 | 0.70 |
| 390 | 0.88 | 0.95 | 0.99 | 1.00 | 0.98 | 0.93 | 0.86 | 0.79 | 0.72 |
| 385 | 0.87 | 0.94 | 0.99 | 1.00 | 0.98 | 0.94 | 0.88 | 0.81 | 0.73 |
| 380 | 0.85 | 0.93 | 0.98 | 1.00 | 0.99 | 0.95 | 0.89 | 0.82 | 0.75 |
| 375 | 0.84 | 0.92 | 0.98 | 1.00 | 0.99 | 0.95 | 0.90 | 0.83 | 0.76 |
| 370 | 0.82 | 0.91 | 0.97 | 1.00 | 0.99 | 0.96 | 0.91 | 0.84 | 0.77 |
| 365 | 0.80 | 0.90 | 0.97 | 1.00 | 1.00 | 0.97 | 0.92 | 0.86 | 0.79 |
| 360 | 0.79 | 0.89 | 0.96 | 0.99 | 1.00 | 0.97 | 0.93 | 0.87 | 0.80 |
| 355 | 0.77 | 0.88 | 0.95 | 0.99 | 1.00 | 0.98 | 0.94 | 0.88 | 0.81 |
| 350 | 0.75 | 0.86 | 0.94 | 0.99 | 1.00 | 0.98 | 0.94 | 0.89 | 0.83 |
| 345 | 0.73 | 0.85 | 0.94 | 0.98 | 1.00 | 0.99 | 0.95 | 0.90 | 0.84 |
| 340 | 0.72 | 0.84 | 0.93 | 0.98 | 1.00 | 0.99 | 0.96 | 0.91 | 0.85 |
| 335 | 0.70 | 0.83 | 0.92 | 0.98 | 1.00 | 0.99 | 0.96 | 0.92 | 0.86 |
| 330 | 0.68 | 0.81 | 0.91 | 0.97 | 1.00 | 1.00 | 0.97 | 0.92 | 0.87 |
| 325 | 0.67 | 0.80 | 0.90 | 0.97 | 1.00 | 1.00 | 0.97 | 0.93 | 0.88 |
| 320 | 0.65 | 0.79 | 0.89 | 0.96 | 0.99 | 1.00 | 0.98 | 0.94 | 0.89 |
| 315 | 0.64 | 0.78 | 0.88 | 0.95 | 0.99 | 1.00 | 0.98 | 0.94 | 0.90 |
| 310 | 0.62 | 0.77 | 0.87 | 0.95 | 0.99 | 1.00 | 0.98 | 0.95 | 0.90 |

FIG. 4C

TWIST ANGLE (deg.)

| Δnd of LIQUID CRYSTAL LAYER (nm) | 0 | 10 | 20 | 30 | 40 | 50 | 60 | 70 | 80 | 90 |
|---|---|---|---|---|---|---|---|---|---|---|
| 305 | -0.94 | -0.92 | -0.84 | -0.72 | -0.57 | -0.38 | -0.18 | 0.03 | 0.24 | 0.44 |
| 300 | -0.96 | -0.93 | -0.86 | -0.74 | -0.58 | -0.40 | -0.19 | 0.02 | 0.23 | 0.42 |
| 295 | -0.97 | -0.95 | -0.87 | -0.76 | -0.60 | -0.41 | -0.21 | 0.00 | 0.21 | 0.41 |
| 290 | -0.99 | -0.96 | -0.89 | -0.77 | -0.61 | -0.43 | -0.22 | -0.01 | 0.20 | 0.40 |
| 285 | -0.99 | -0.97 | -0.90 | -0.78 | -0.62 | -0.44 | -0.23 | -0.02 | 0.19 | 0.39 |
| 280 | -1.00 | -0.97 | -0.90 | -0.78 | -0.63 | -0.45 | -0.24 | -0.03 | 0.18 | 0.38 |
| 275 | -1.00 | -0.98 | -0.90 | -0.79 | -0.63 | -0.45 | -0.25 | -0.04 | 0.17 | 0.37 |
| 270 | -1.00 | -0.97 | -0.90 | -0.79 | -0.64 | -0.45 | -0.25 | -0.05 | 0.16 | 0.36 |
| 265 | -0.99 | -0.97 | -0.90 | -0.78 | -0.63 | -0.45 | -0.26 | -0.05 | 0.16 | 0.35 |
| 260 | -0.99 | -0.96 | -0.89 | -0.78 | -0.63 | -0.45 | -0.26 | -0.05 | 0.15 | 0.35 |
| 255 | -0.97 | -0.95 | -0.88 | -0.77 | -0.62 | -0.45 | -0.25 | -0.05 | 0.15 | 0.35 |
| 250 | -0.96 | -0.94 | -0.87 | -0.76 | -0.61 | -0.44 | -0.25 | -0.05 | 0.15 | 0.34 |
| 245 | -0.94 | -0.92 | -0.85 | -0.74 | -0.60 | -0.43 | -0.24 | -0.04 | 0.15 | 0.34 |
| 240 | -0.92 | -0.90 | -0.83 | -0.73 | -0.59 | -0.42 | -0.23 | -0.04 | 0.16 | 0.34 |
| 235 | -0.90 | -0.88 | -0.81 | -0.71 | -0.57 | -0.40 | -0.22 | -0.03 | 0.16 | 0.35 |
| 230 | -0.87 | -0.85 | -0.79 | -0.68 | -0.55 | -0.39 | -0.21 | -0.02 | 0.17 | 0.35 |
| 225 | -0.84 | -0.82 | -0.76 | -0.66 | -0.53 | -0.37 | -0.19 | -0.01 | 0.18 | 0.36 |
| 220 | -0.81 | -0.79 | -0.73 | -0.63 | -0.50 | -0.35 | -0.18 | 0.01 | 0.19 | 0.36 |
| 215 | -0.77 | -0.75 | -0.70 | -0.60 | -0.47 | -0.32 | -0.16 | 0.02 | 0.20 | 0.37 |
| 210 | -0.74 | -0.72 | -0.66 | -0.57 | -0.44 | -0.30 | -0.13 | 0.04 | 0.21 | 0.38 |
| 205 | -0.70 | -0.68 | -0.62 | -0.53 | -0.41 | -0.27 | -0.11 | 0.06 | 0.23 | 0.39 |
| 200 | -0.65 | -0.64 | -0.58 | -0.50 | -0.38 | -0.24 | -0.09 | 0.08 | 0.24 | 0.40 |
| 195 | -0.61 | -0.59 | -0.54 | -0.46 | -0.34 | -0.21 | -0.06 | 0.10 | 0.26 | 0.41 |
| 190 | -0.56 | -0.55 | -0.50 | -0.41 | -0.31 | -0.18 | -0.03 | 0.12 | 0.28 | 0.43 |
| 185 | -0.52 | -0.50 | -0.45 | -0.37 | -0.27 | -0.14 | 0.00 | 0.15 | 0.30 | 0.44 |
| 180 | -0.47 | -0.45 | -0.40 | -0.33 | -0.23 | -0.11 | 0.03 | 0.17 | 0.32 | 0.45 |
| 175 | -0.42 | -0.40 | -0.35 | -0.28 | -0.18 | -0.07 | 0.06 | 0.20 | 0.34 | 0.47 |
| 170 | -0.36 | -0.35 | -0.30 | -0.23 | -0.14 | -0.03 | 0.09 | 0.23 | 0.36 | 0.49 |
| 165 | -0.31 | -0.29 | -0.25 | -0.19 | -0.10 | 0.01 | 0.13 | 0.25 | 0.38 | 0.51 |
| 160 | -0.25 | -0.24 | -0.20 | -0.14 | -0.05 | 0.05 | 0.16 | 0.28 | 0.41 | 0.52 |
| 155 | -0.20 | -0.19 | -0.15 | -0.09 | -0.01 | 0.09 | 0.20 | 0.31 | 0.43 | 0.54 |
| 150 | -0.14 | -0.13 | -0.09 | -0.04 | 0.04 | 0.13 | 0.24 | 0.34 | 0.46 | 0.56 |
| 145 | -0.09 | -0.07 | -0.04 | 0.01 | 0.09 | 0.17 | 0.27 | 0.38 | 0.48 | 0.58 |
| 140 | -0.03 | -0.02 | 0.01 | 0.07 | 0.13 | 0.22 | 0.31 | 0.41 | 0.51 | 0.60 |
| 135 | 0.03 | 0.04 | 0.07 | 0.12 | 0.18 | 0.26 | 0.35 | 0.44 | 0.53 | 0.62 |
| 130 | 0.09 | 0.10 | 0.12 | 0.17 | 0.23 | 0.30 | 0.38 | 0.47 | 0.56 | 0.64 |
| 125 | 0.14 | 0.15 | 0.18 | 0.22 | 0.28 | 0.35 | 0.42 | 0.50 | 0.59 | 0.67 |
| 120 | 0.20 | 0.21 | 0.23 | 0.27 | 0.32 | 0.39 | 0.46 | 0.53 | 0.61 | 0.69 |
| 115 | 0.25 | 0.26 | 0.28 | 0.32 | 0.37 | 0.43 | 0.50 | 0.57 | 0.64 | 0.71 |
| 110 | 0.31 | 0.32 | 0.34 | 0.37 | 0.42 | 0.47 | 0.53 | 0.60 | 0.66 | 0.73 |
| 105 | 0.36 | 0.37 | 0.39 | 0.42 | 0.46 | 0.51 | 0.57 | 0.63 | 0.69 | 0.75 |
| 100 | 0.42 | 0.42 | 0.44 | 0.47 | 0.51 | 0.55 | 0.60 | 0.66 | 0.71 | 0.77 |
| 95 | 0.47 | 0.47 | 0.49 | 0.51 | 0.55 | 0.59 | 0.64 | 0.69 | 0.74 | 0.79 |
| 90 | 0.52 | 0.52 | 0.54 | 0.56 | 0.59 | 0.63 | 0.67 | 0.72 | 0.76 | 0.81 |
| 85 | 0.56 | 0.57 | 0.58 | 0.60 | 0.63 | 0.67 | 0.70 | 0.74 | 0.79 | 0.83 |
| 80 | 0.61 | 0.61 | 0.63 | 0.65 | 0.67 | 0.70 | 0.74 | 0.77 | 0.81 | 0.84 |
| 75 | 0.65 | 0.66 | 0.67 | 0.69 | 0.71 | 0.73 | 0.77 | 0.80 | 0.83 | 0.86 |
| 70 | 0.70 | 0.70 | 0.71 | 0.72 | 0.74 | 0.77 | 0.79 | 0.82 | 0.85 | 0.88 |
| 65 | 0.74 | 0.74 | 0.75 | 0.76 | 0.78 | 0.80 | 0.82 | 0.85 | 0.87 | 0.89 |
| 60 | 0.77 | 0.78 | 0.78 | 0.79 | 0.81 | 0.83 | 0.85 | 0.87 | 0.89 | 0.91 |
| 55 | 0.81 | 0.81 | 0.82 | 0.83 | 0.84 | 0.85 | 0.87 | 0.89 | 0.91 | 0.92 |
| 50 | 0.84 | 0.84 | 0.85 | 0.86 | 0.87 | 0.88 | 0.89 | 0.91 | 0.92 | 0.94 |
| 45 | 0.87 | 0.87 | 0.88 | 0.88 | 0.89 | 0.90 | 0.91 | 0.92 | 0.94 | 0.95 |
| 40 | 0.90 | 0.90 | 0.90 | 0.91 | 0.91 | 0.92 | 0.93 | 0.94 | 0.95 | 0.96 |
| 35 | 0.92 | 0.92 | 0.92 | 0.93 | 0.93 | 0.94 | 0.95 | 0.95 | 0.96 | 0.97 |
| 30 | 0.94 | 0.94 | 0.94 | 0.95 | 0.95 | 0.96 | 0.96 | 0.97 | 0.97 | 0.98 |
| 25 | 0.96 | 0.96 | 0.96 | 0.96 | 0.97 | 0.97 | 0.97 | 0.98 | 0.98 | 0.98 |
| 20 | 0.97 | 0.97 | 0.98 | 0.98 | 0.98 | 0.98 | 0.98 | 0.98 | 0.99 | 0.99 |
| 15 | 0.99 | 0.99 | 0.99 | 0.99 | 0.99 | 0.99 | 0.99 | 0.99 | 0.99 | 0.99 |
| 10 | 0.99 | 0.99 | 0.99 | 0.99 | 0.99 | 0.99 | 1.00 | 1.00 | 1.00 | 1.00 |
| 5 | 1.00 | 1.00 | 1.00 | 1.00 | 1.00 | 1.00 | 1.00 | 1.00 | 1.00 | 1.00 |

FIG. 4D

TWIST ANGLE (deg.)

| Δnd OF LIQUID CRYSTAL LAYER (nm) | 100 | 110 | 120 | 130 | 140 | 150 | 160 | 170 | 180 |
|---|---|---|---|---|---|---|---|---|---|
| 305 | 0.61 | 0.75 | 0.87 | 0.94 | 0.99 | 1.00 | 0.99 | 0.96 | 0.91 |
| 300 | 0.60 | 0.74 | 0.86 | 0.94 | 0.98 | 1.00 | 0.99 | 0.96 | 0.92 |
| 295 | 0.58 | 0.73 | 0.85 | 0.93 | 0.98 | 1.00 | 0.99 | 0.97 | 0.92 |
| 290 | 0.57 | 0.72 | 0.84 | 0.93 | 0.98 | 1.00 | 0.99 | 0.97 | 0.93 |
| 285 | 0.56 | 0.71 | 0.83 | 0.92 | 0.97 | 1.00 | 1.00 | 0.97 | 0.94 |
| 280 | 0.55 | 0.71 | 0.83 | 0.92 | 0.97 | 1.00 | 1.00 | 0.98 | 0.94 |
| 275 | 0.55 | 0.70 | 0.82 | 0.91 | 0.97 | 1.00 | 1.00 | 0.98 | 0.95 |
| 270 | 0.54 | 0.69 | 0.81 | 0.90 | 0.96 | 0.99 | 1.00 | 0.98 | 0.95 |
| 265 | 0.53 | 0.68 | 0.81 | 0.90 | 0.96 | 0.99 | 1.00 | 0.99 | 0.96 |
| 260 | 0.53 | 0.68 | 0.80 | 0.90 | 0.96 | 0.99 | 1.00 | 0.99 | 0.96 |
| 255 | 0.52 | 0.67 | 0.80 | 0.89 | 0.96 | 0.99 | 1.00 | 0.99 | 0.96 |
| 250 | 0.52 | 0.67 | 0.79 | 0.89 | 0.95 | 0.99 | 1.00 | 0.99 | 0.97 |
| 245 | 0.52 | 0.67 | 0.79 | 0.88 | 0.95 | 0.99 | 1.00 | 0.99 | 0.97 |
| 240 | 0.52 | 0.66 | 0.79 | 0.88 | 0.95 | 0.99 | 1.00 | 0.99 | 0.97 |
| 235 | 0.52 | 0.66 | 0.78 | 0.88 | 0.94 | 0.98 | 1.00 | 1.00 | 0.98 |
| 230 | 0.52 | 0.66 | 0.78 | 0.88 | 0.94 | 0.98 | 1.00 | 1.00 | 0.98 |
| 225 | 0.52 | 0.66 | 0.78 | 0.87 | 0.94 | 0.98 | 1.00 | 1.00 | 0.98 |
| 220 | 0.52 | 0.66 | 0.78 | 0.87 | 0.94 | 0.98 | 1.00 | 1.00 | 0.98 |
| 215 | 0.53 | 0.67 | 0.78 | 0.87 | 0.94 | 0.98 | 1.00 | 1.00 | 0.99 |
| 210 | 0.53 | 0.67 | 0.78 | 0.87 | 0.94 | 0.98 | 1.00 | 1.00 | 0.99 |
| 205 | 0.54 | 0.67 | 0.78 | 0.87 | 0.93 | 0.98 | 1.00 | 1.00 | 0.99 |
| 200 | 0.55 | 0.68 | 0.78 | 0.87 | 0.93 | 0.97 | 1.00 | 1.00 | 0.99 |
| 195 | 0.55 | 0.68 | 0.79 | 0.87 | 0.93 | 0.97 | 1.00 | 1.00 | 0.99 |
| 190 | 0.56 | 0.69 | 0.79 | 0.87 | 0.93 | 0.97 | 0.99 | 1.00 | 0.99 |
| 185 | 0.57 | 0.69 | 0.79 | 0.87 | 0.93 | 0.97 | 0.99 | 1.00 | 0.99 |
| 180 | 0.58 | 0.70 | 0.80 | 0.88 | 0.93 | 0.97 | 0.99 | 1.00 | 0.99 |
| 175 | 0.60 | 0.71 | 0.80 | 0.88 | 0.93 | 0.97 | 0.99 | 1.00 | 1.00 |
| 170 | 0.61 | 0.72 | 0.81 | 0.88 | 0.93 | 0.97 | 0.99 | 1.00 | 1.00 |
| 165 | 0.62 | 0.72 | 0.81 | 0.88 | 0.94 | 0.97 | 0.99 | 1.00 | 1.00 |
| 160 | 0.63 | 0.73 | 0.82 | 0.89 | 0.94 | 0.97 | 0.99 | 1.00 | 1.00 |
| 155 | 0.65 | 0.74 | 0.82 | 0.89 | 0.94 | 0.97 | 0.99 | 1.00 | 1.00 |
| 150 | 0.66 | 0.75 | 0.83 | 0.89 | 0.94 | 0.97 | 0.99 | 1.00 | 1.00 |
| 145 | 0.68 | 0.76 | 0.84 | 0.90 | 0.94 | 0.97 | 0.99 | 1.00 | 1.00 |
| 140 | 0.69 | 0.77 | 0.84 | 0.90 | 0.94 | 0.97 | 0.99 | 1.00 | 1.00 |
| 135 | 0.71 | 0.79 | 0.85 | 0.90 | 0.95 | 0.97 | 0.99 | 1.00 | 1.00 |
| 130 | 0.72 | 0.80 | 0.86 | 0.91 | 0.95 | 0.98 | 0.99 | 1.00 | 1.00 |
| 125 | 0.74 | 0.81 | 0.87 | 0.91 | 0.95 | 0.98 | 0.99 | 1.00 | 1.00 |
| 120 | 0.76 | 0.82 | 0.87 | 0.92 | 0.95 | 0.98 | 0.99 | 1.00 | 1.00 |
| 115 | 0.77 | 0.83 | 0.88 | 0.92 | 0.96 | 0.98 | 0.99 | 1.00 | 1.00 |
| 110 | 0.79 | 0.84 | 0.89 | 0.93 | 0.96 | 0.98 | 0.99 | 1.00 | 1.00 |
| 105 | 0.80 | 0.85 | 0.90 | 0.93 | 0.96 | 0.98 | 0.99 | 1.00 | 1.00 |
| 100 | 0.82 | 0.87 | 0.91 | 0.94 | 0.96 | 0.98 | 0.99 | 1.00 | 1.00 |
| 95 | 0.84 | 0.88 | 0.91 | 0.94 | 0.97 | 0.98 | 0.99 | 1.00 | 1.00 |
| 90 | 0.85 | 0.89 | 0.92 | 0.95 | 0.97 | 0.98 | 0.99 | 1.00 | 1.00 |
| 85 | 0.86 | 0.90 | 0.93 | 0.95 | 0.97 | 0.99 | 0.99 | 1.00 | 1.00 |
| 80 | 0.88 | 0.91 | 0.94 | 0.96 | 0.97 | 0.99 | 1.00 | 1.00 | 1.00 |
| 75 | 0.89 | 0.92 | 0.94 | 0.96 | 0.98 | 0.99 | 1.00 | 1.00 | 1.00 |
| 70 | 0.91 | 0.93 | 0.95 | 0.97 | 0.98 | 0.99 | 1.00 | 1.00 | 1.00 |
| 65 | 0.92 | 0.94 | 0.96 | 0.97 | 0.98 | 0.99 | 1.00 | 1.00 | 1.00 |
| 60 | 0.93 | 0.95 | 0.96 | 0.97 | 0.98 | 0.99 | 1.00 | 1.00 | 1.00 |
| 55 | 0.94 | 0.95 | 0.97 | 0.98 | 0.99 | 0.99 | 1.00 | 1.00 | 1.00 |
| 50 | 0.95 | 0.96 | 0.97 | 0.98 | 0.99 | 0.99 | 1.00 | 1.00 | 1.00 |
| 45 | 0.96 | 0.97 | 0.98 | 0.99 | 0.99 | 1.00 | 1.00 | 1.00 | 1.00 |
| 40 | 0.97 | 0.98 | 0.98 | 0.99 | 0.99 | 1.00 | 1.00 | 1.00 | 1.00 |
| 35 | 0.97 | 0.98 | 0.99 | 0.99 | 0.99 | 1.00 | 1.00 | 1.00 | 1.00 |
| 30 | 0.98 | 0.99 | 0.99 | 0.99 | 1.00 | 1.00 | 1.00 | 1.00 | 1.00 |
| 25 | 0.99 | 0.99 | 0.99 | 1.00 | 1.00 | 1.00 | 1.00 | 1.00 | 1.00 |
| 20 | 0.99 | 0.99 | 1.00 | 1.00 | 1.00 | 1.00 | 1.00 | 1.00 | 1.00 |
| 15 | 1.00 | 1.00 | 1.00 | 1.00 | 1.00 | 1.00 | 1.00 | 1.00 | 1.00 |
| 10 | 1.00 | 1.00 | 1.00 | 1.00 | 1.00 | 1.00 | 1.00 | 1.00 | 1.00 |
| 5 | 1.00 | 1.00 | 1.00 | 1.00 | 1.00 | 1.00 | 1.00 | 1.00 | 1.00 |

LIQUID CRYSTAL DISPLAY PANEL

TECHNICAL FIELD

The present invention relates to liquid crystal display panels and, in particular, to a transverse electric field mode liquid crystal display panel.

BACKGROUND ART

Liquid crystal display panels of a transverse electric field mode such the In-phase Switching (IPS) mode or the Fringe Field Switching (FFS) mode have the advantage of being smaller in viewing-angle dependency of gamma-characteristics than liquid crystal display panels of a conventional longitudinal electric field mode (e.g. the VA mode). As such, transverse electric field mode liquid crystal display devices have been widely used as small-to-medium-sized liquid crystal display panels.

Meanwhile, increases in definition of liquid crystal display panels lead to decreases in pixel aperture ratio (ratio of the total area of the pixels to the display region), making it difficult to achieve sufficient display luminance. In particular, small-to-medium-sized liquid crystal display panels for mobile use undesirably become lower in contrast ratio when viewed in lighted environments such as outdoor environments.

Measures have been taken so far by increasing the display luminance through increased backlight luminance and thereby increasing the contrast ratio. However, since increases in backlight luminance undesirably lead to increases in power consumption, these measures taken by raising the backlight luminance are approaching their limits.

A cause of liquid crystal display panels becoming lower in contrast ratio in lighted environments is the reflection of light by the liquid crystal display panels. Given these circumstances, attempts to improve the contrast ratio have been made by suppressing the reflection of light by the liquid crystal display panels.

For example, PTL 1 discloses an IPS mode liquid crystal display panel that includes a phase difference plate (sometimes referred to as "front-side phase difference plate") provided between a linearly polarizing plate (sometimes referred to as "front-side linearly polarizing plate") disposed on a viewer's side (sometimes referred to as "front side") and a liquid crystal cell and thereby prevents light reflected by the liquid crystal cell from being emitted toward the viewer's side. The front-side phase difference plate is configured so that linearly polarized light transmitted through the front-side linearly polarizing plate turns into circularly polarized light that rotates in a first direction and enters the liquid crystal cell. That is, the front-side linearly polarizing plate and the front-side phase difference plate function together as a circularly polarizing plate. When reflected (by the interface where the refractive index changes from being low to being high), the circularly polarized light comes to have its P and S waves both shifted in phase by $\pi$ radians and, as a result of this, have its direction of rotation reversed. Therefore, light reflected by the liquid crystal cell (transparent substrate) turns into circularly polarized light whose direction of rotation is a second direction opposite to the first direction, and linearly polarized light into which this circularly polarized light is transformed by passing through the front-side phase difference plate is absorbed by the front-side linearly polarizing plate.

The liquid crystal display panel of PTL 1 further includes a phase difference plate (sometimes referred to as "rear-side phase difference plate") provided between a linearly polarizing plate (sometimes referred to as "rear-side linearly polarizing plate") disposed on a backlight side (sometimes referred to as "rear side") and the liquid crystal cell. The rear-side phase difference plate is configured so that when having passed through the rear-side phase difference plate and a liquid crystal layer that is in a black display state, linearly polarized light transmitted through the rear-side linearly polarizing plate turns into circularly polarized light whose direction of rotation is the second direction opposite to the first direction. By passing through the front-side phase difference plate, the circularly polarized light whose direction of rotation is the second direction is transformed into linearly polarized light that is absorbed by the front-side polarizing plate.

PTL 1 provides an IPS mode liquid crystal display panel that can achieve high image quality even when used outdoors.

Meanwhile, as liquid crystal display panels that are suitable for outdoor displays, semitransparent liquid crystal display panels have been known. Each pixel of such a semitransparent liquid crystal display panel includes a reflection mode display region (reflection region) and a transmission mode display region (transmission region). The reflection region is constituted, for example, by using a reflecting electrode as the pixel electrode and making the liquid crystal layer about half as thick as it is in the transmission region. Placing a circularly polarizing plate on the viewer's side makes it possible to perform a reflection mode display with a single polarizing plate.

PTL 2 discloses a liquid crystal display panel characterized in driving at least the transmission region in a transverse electric field mode. The semitransparent liquid crystal display panel described in PTL 2 is configured such that a front-side circularly polarizing plate, a front-side phase difference plate (viewer's-side compensation plate), a semitransparent liquid crystal cell, a rear-side phase difference plate (back-surface-side compensation plate), and a rear-side polarizing plate are arranged in this order. PTL 2 (e.g. paragraphs [0148] to [0158]) describes a liquid crystal display panel including a liquid crystal layer whose initial alignment is in a twisted state. PTL 2 states that the use of a liquid crystal layer whose initial alignment is in a twisted state better suppresses variations in refractive index due to variations in thickness of the liquid crystal layer than the use of a parallel-aligned liquid crystal layer, allowing the front-side phase difference plate to implement satisfactory compensation.

CITATION LIST

Patent Literature

PTL 1: Japanese Unexamined Patent Application Publication No. 2012-173672
PTL 2: Japanese Patent No. 5278720

SUMMARY OF INVENTION

Technical Problem

The liquid crystal display panel described in PTL 1 is an IPS mode liquid crystal display panel, with only a parallel-aligned liquid crystal layer taken into account. Such a liquid crystal display panel including a parallel-aligned liquid crystal layer is undesirably low in transmittance with respect to incoming circularly polarized light. In particular, use of a positive nematic liquid crystal whose dielectric anisotropy is positive leads to a remarkable decrease in transmittance. Further, a liquid crystal display panel including a circularly polarizing plate or an elliptically polarizing plate undesirably becomes lower in black display quality when there are variations in thickness of the liquid crystal layer due to manufacturing variations or the like. PTL 2 states that the use of a twistedly-aligned liquid crystal layer makes it possible to prevent the black display quality from becoming lower due to variations in thickness of the liquid crystal layer. However, PTL 2 does not even mention a specific size of the retardation of the liquid crystal layer.

Meanwhile, as is clear from the descriptions in FIG. 2, paragraph [0030], and the like of PTL 1, the only reflection taken into account in PTL 1 is the reflection by the viewer's-side transparent substrate of outside light having entered the liquid crystal display panel.

However, the inventors of the present invention studied and found that a reflection that causes a decrease in contrast ratio is caused not only by the reflection of light by the viewer's-side transparent substrate of the liquid crystal cell but also by the reflection of light by a wire, an electrode, or the like provided on a side of the back-surface-side substrate that faces the liquid crystal layer. PTL 1 does not mention a configuration in which the reflection of light by a wire, an electrode, or the like provided on the back-surface-side substrate is suppressed.

The present invention has been made to solve the foregoing problems and has as an object to provide a high-transmittance transverse electric field mode liquid crystal display panel that reflects less outside light than a conventional one.

Solution to Problem

A liquid crystal display panel according to an embodiment of the present invention is a liquid crystal display panel including: a liquid crystal cell including a first substrate, a second substrate, and a liquid crystal layer provided between the first substrate and the second substrate; a first polarizing plate disposed on a back surface side of the liquid crystal cell; and a second polarizing plate disposed on a viewer's side of the liquid crystal cell, wherein the first substrate includes a pair of electrodes that causes a transverse electric field to be generated in the liquid crystal layer, the liquid crystal layer contains a nematic liquid crystal whose dielectric anisotropy is negative, the liquid crystal layer has Δnd of less than 550 nm, where Δn is the birefringent index of the nematic liquid crystal and d is the thickness of the liquid crystal layer, the liquid crystal layer is in a twist alignment state when no voltage is applied, when polarized light whose Stokes parameter S3 takes on an absolute value |S3| of 1.00 enters the liquid crystal layer, |S3| of polarized light having perpendicularly passed through the liquid crystal layer is 0.85 or greater, and the first polarizing plate and the second polarizing plate are circularly polarizing plates or elliptically polarizing plates whose ellipticity is 0.422 or greater.

In an embodiment, Δnd of the liquid crystal layer is 340 nm or greater.

In an embodiment, Δnd of the liquid crystal layer is 420 nm or greater.

In an embodiment, |S3| of the polarized light having perpendicularly passed through the liquid crystal layer is 0.95 or greater.

In an embodiment, the liquid crystal layer has a twist angle of 50 degrees or greater to less than 90 degrees. The twist angle is for example 73 degrees.

In an embodiment, the first polarizing plate and the second polarizing plate each independently have a retardation of 90 nm or greater to less than 138 nm.

In an embodiment, an angle formed by an azimuthal direction of alignment of a liquid crystal molecule near the first substrate in the liquid crystal layer and an azimuthal direction of the major axis of elliptically polarized light having passed through the first polarizing plate or the second polarizing plate ranges from 0 degree or larger to 5 degrees or less or from 90 degrees or greater to 95 degrees or less.

In an embodiment, Δnd is approximately given by $-0.0134 \cdot \theta^2 + 0.414 \cdot \theta + 544$, where θ is the twist angle of the liquid crystal layer in the twist alignment state.

Advantageous Effects of Invention

An embodiment of the present invention provides a transverse electric field mode liquid crystal display panel that reflects less outside light than a conventional one.

BRIEF DESCRIPTION OF DRAWINGS

FIG. 4A is a diagram showing the values of S3 in the FOM shown in FIG. 2 at which the twist angle falls within a range of 0 degree or greater to 90 degrees or less (in 10-degree increments) and Δnd falls within a range of 310 nm or greater to 600 nm or less (in 5-nm increments).

FIG. 4B is a diagram showing the values of S3 in the FOM shown in FIG. 2 at which the twist angle falls within a range of 100 degrees or greater to 180 degrees or less (in 10-degree increments) and Δnd falls within a range of 310 nm or greater to 600 nm or less (in 5-nm increments).

FIG. 4C is a diagram showing the values of S3 in the FOM shown in FIG. 2 at which the twist angle falls within a range of 0 degree or greater to 90 degrees or less (in 10-degree increments) and Δnd falls within a range of 5 nm or greater to 305 nm or less (in 5-nm increments).

FIG. 4D is a diagram showing the values of S3 in the FOM shown in FIG. 2 at which the twist angle falls within a range of 100 degrees or greater to 180 degrees or less (in 10-degree increments) and Δnd falls within a range of 5 nm or greater to 305 nm or less (in 5-nm increments).

DESCRIPTION OF EMBODIMENTS

Figure 1:
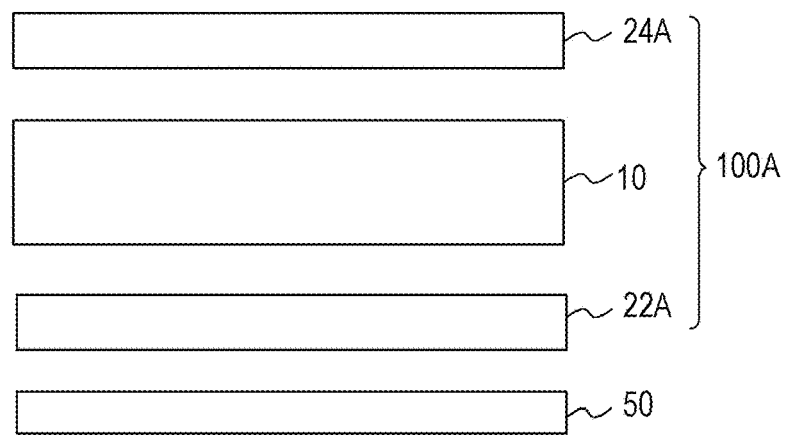
FIG. 1 illustrates a schematic exploded cross-sectional view (a) of a liquid crystal display panel 100A according to Embodiment 1 of the present invention together with a backlight 50, a schematic cross-sectional view (b) of a part that corresponds to one pixel of a liquid crystal cell 10 of the liquid crystal display panel 100A, and a schematic plan view (c) of a part that corresponds to one pixel of the liquid crystal cell 10.
Figure 1:
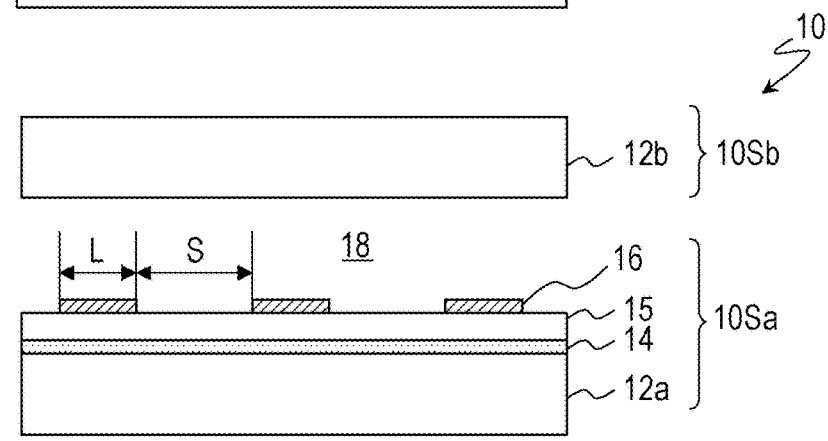
Figure 1:
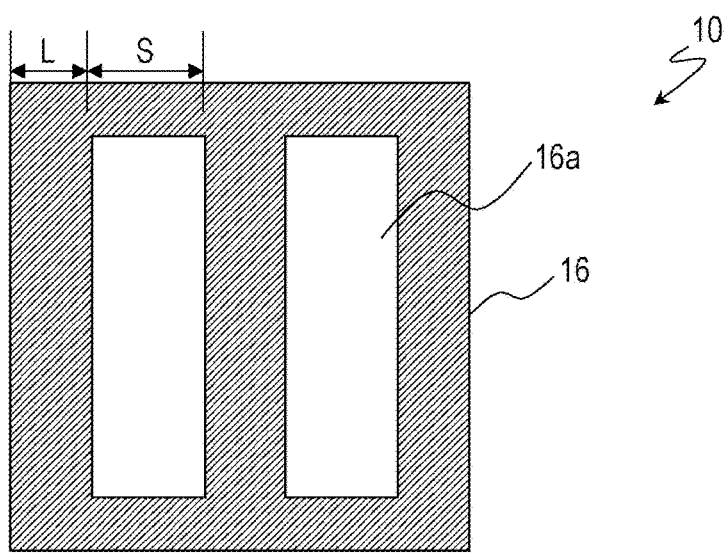

A liquid crystal display panel according to an embodiment of the present invention includes: a liquid crystal cell including a first substrate (back-surface-side substrate disposed on a backlight-side substrate, e.g. a TFT substrate), a second substrate (viewer's-side substrate, e.g. a color filter substrate), and a liquid crystal layer provided between the first substrate and the second substrate; a first polarizing plate disposed on a back surface side of the liquid crystal cell; and a second polarizing plate disposed on a viewer's side of the liquid crystal cell.

The first substrate includes a pair of electrodes that causes a transverse electric field to be generated in the liquid crystal layer. The liquid crystal layer contains a nematic liquid crystal whose dielectric anisotropy is negative. The liquid crystal layer has Δnd of less than 550 nm, where Δn is the birefringent index of the nematic liquid crystal and d is the thickness of the liquid crystal layer. The liquid crystal layer is in a twist alignment state when no voltage is applied. When polarized light whose Stokes parameter S3 takes on an absolute value |S3| of 1.00 enters the liquid crystal layer, |S3| of polarized light having perpendicularly passed through the liquid crystal layer is 0.85 or greater. Note here that |S3| is a value normalized so that S0=1. The first polarizing plate and the second polarizing plate are both circularly or elliptically polarizing plates, and each independently have an ellipticity (minor axis/major axis of an ellipse) of 0.422 or greater to 1.000 or less of polarized light having passed therethrough. In general, a circularly polarizing plate and an elliptically polarizing plate have a laminated structure of a linearly polarizing layer that transmits linearly polarized light and a phase difference layer. The retardation of a phase difference layer of a polarizing plate may be herein referred to as "retardation of the polarizing plate". A polarizing plate (circularly polarizing plate or elliptically polarizing plate) whose ellipticity ranges from 0.422 or greater to 1.000 or less is equivalent to a polarizing plate placed so that the slow axis of a phase difference layer having a retardation of 70 nm or greater to 138 nm or less forms an angle of 45 degrees with respect to the polarizing axis of the linearly polarizing layer.

That is, a liquid crystal display panel according to an embodiment of the present invention is a liquid crystal display panel of a transverse electric field mode such as the IPS mode or the FFS mode whose liquid crystal layer contains a nematic liquid crystal whose dielectric anisotropy is negative. The application of a voltage to the pair of electrodes that causes a transverse electric field to be generated in the liquid crystal layer not only causes a transverse electric field (horizontal electric field, electric field that is parallel to the plane of the liquid crystal layer) to be generated in the liquid crystal layer but also causes a longitudinal electric field component to be generated (e.g. near an edge of the pair of electrodes). The liquid crystal molecules of a nematic liquid crystal whose dielectric anisotropy is positive align themselves so that the major axis of each molecule is parallel to an electric field. Therefore, in a region where there is a strong longitudinal electric field component, the liquid crystal molecules rise, with the result that there occur retardation unevenness and insufficient twisting in the plane. On the other hand, the liquid crystal molecules of a nematic liquid crystal whose dielectric anisotropy is negative align themselves so that the major axis of each molecule is orthogonal to an electric field. Therefore, even in a region where there is a strong longitudinal electric field component, the liquid crystal molecules only rise slightly, with the result that the liquid crystal molecules keep themselves aligned parallel to the plane of the liquid crystal layer. Therefore, the use of a nematic liquid crystal whose dielectric anisotropy is negative makes it possible to improve display quality. This effect is great in a liquid crystal display panel of the FFS mode, in which more longitudinal electric field components are generated than in the IPS mode. Given these circumstances, liquid crystal display panels of Embodiments 1 and 2 are described by taking FFS mode liquid crystal display panels as examples.

Further, since Δnd, which is the product of the birefringent index of the nematic liquid crystal constituting the liquid crystal layer and the thickness d of the liquid crystal layer, is less than 550 nm, a so-called lambda condition (Δnd=550 nm) for a black display is not satisfied in untwisted parallel alignment. It should be noted that the wavelength λ takes on a value of 550 nm generally because the maximum spectral luminous efficacy is attained when the wavelength λ takes on a value of 550 nm.

Further, the liquid crystal layer is in a twist alignment state when no voltage is applied, and when polarized light whose Stokes parameter S3 takes on an absolute value |S3| of 1.00 enters the liquid crystal layer, |S3| of polarized light having perpendicularly passed through the liquid crystal layer is 0.85 or greater. Note here that there are four Stokes parameters S0, S1, S2, and S3, which represent intensity, a horizontal linear polarization component, a 45-degree linear polarization component, and a right-handed circular polarization component, respectively, and in the case of completely polarized light (linearly polarized light, circularly polarized light, or elliptically polarized light), the relationship $S1^2+S2^2+S3^2=S0^2$ holds. When S0=1 and S3=1, it represents right-handed circularly polarized light, and when S0=1 and S3=−1, it represents left-handed circularly polarized light. That is, when the Stokes parameter S3 takes on an absolute value |S3| of 1.00, it means that S3 of right-handed circularly polarized light is 1.00 or that S3 of left-handed circularly polarized light is −1.00. The case where when polarized light whose |S3| is 1.00 enters the liquid crystal layer, |S3| of polarized light having perpendicularly passed through the liquid crystal layer is 0.85 or greater specifically encompasses a case where when polarized light whose S3 is 1.00 enters the liquid crystal layer, S3 of polarized light having perpendicularly passed through the liquid crystal layer is 0.85 or greater and a case where when polarized light whose S3 is −1.00 enters the liquid crystal layer, S3 of polarized light having perpendicularly passed through the liquid crystal layer is −0.85 or less.

When a change that polarized light undergoes by passing through the liquid crystal layer is described herein with reference to a Stokes parameter, it is targeted at polarized light that perpendicularly enters the liquid crystal layer and perpendicularly passes through the liquid crystal layer, unless otherwise noted.

In the following, a liquid crystal display panel according to an embodiment of the present invention is described by taking, as an example, a case where incoming polarized light (which refers to "polarized light emitted from the backlight and transmitted through the first polarizing plate") is right-handed circularly polarized light (S=1.00), the same applies to a case where the incoming polarized light is left-handed circularly polarized light (S=−1.00). It should be noted that in a case where the first polarizing plate transmits right-handed circularly polarized light, the second polarizing plate is configured to transmit left-handed circularly polarized light. Conversely, in a case where the first polarizing plate transmits left-handed circularly polarized light, the second polarizing plate is configured to transmit right-handed circularly polarized light.

Further, the twist direction of the liquid crystal layer is a twist direction in which twisting of the major axis of a liquid crystal molecule from the back-surface-side substrate (hereinafter referred to as "lower substrate") toward the viewer's-side substrate (hereinafter referred to as "upper substrate") is seen from the viewer's side. Although the following describes a case (see FIG. 12(a)) where the twist direction of the liquid crystal layer is left-handed (i.e. counterclockwise), the same applies to a case (see FIG. 12(b)) where the twist direction of the liquid crystal layer is right-handed (i.e. clockwise). Combinations of the direction of rotation of circularly polarized light and the twist direction of a liquid crystal layer will be described later.

In general, the lambda condition in a liquid crystal display panel is discussed for a case where the eigenmode of polarized light propagating through the liquid crystal layer is linearly polarized light. In this case, Δnd=550 nm is the lambda condition for a parallel-aligned liquid crystal layer. Right-handed circularly polarized light having entered a liquid crystal layer that satisfies the lambda condition remains right-handed circularly polarized light when having passed through the liquid crystal layer. Since a liquid crystal layer whose Δnd is less than 550 nm does not satisfy the lambda condition, right-handed circularly polarized light having entered the liquid crystal layer whose Δnd is less than 550 nm is no longer right-handed circularly polarized light when having passed through the liquid crystal layer. Meanwhile, since the eigenmode of polarized light propagating through a twistedly-aligned liquid crystal layer is elliptically polarized light, the common lambda condition cannot be discussed solely in light of the value of Δnd. The inventors of the present invention studied and surprisingly found that, even with Δnd of less than 550 nm, a twistedly-aligned liquid crystal layer has a twist angle at which right-handed circularly polarized light having entered the liquid crystal layer remains right-handed circularly polarized light when having passed through the liquid crystal layer. The condition in which right-handed circularly polarized light having entered a twistedly-aligned liquid crystal layer remains right-handed circularly polarized light when exiting the liquid crystal layer is herein referred to as "quasi-lambda condition" as distinguished from the aforementioned common "lambda condition".

The first and second polarizing plates of a liquid crystal display panel according to an embodiment of the present invention are circularly polarizing plates or elliptically polarizing plates whose ellipticity is 0.422 or greater, and each of these polarizing plates is equivalent, for example, to a polarizing plate placed so that the slow axis of a phase difference layer having a retardation of 70 nm or greater to 138 nm or less forms an angle of 45 degrees with respect to the polarizing axis of the linearly polarizing layer. The first polarizing plate and the second polarizing plate each independently have a retardation of 70 nm or greater to 138 nm or less. Assuming that λ is 550 nm, the quarter wavelength (λ/4) is 137.5 nm, which is rounded off to the closest whole number of 138 nm. That is, when a polarizing plate has a retardation of 138 nm, it means that the polarizing plate is a circularly polarizing plate. In general, a circularly polarizing plate is constituted by stacking a linearly polarizing layer and a quarter-wavelength (λ/4) layer. The angle formed by the polarizing axis (transmission axis) of the linearly polarizing plate and the slow axis of the λ/4 layer is 45 degrees. Right-handed circularly polarized light is such circularly polarized light that the direction of rotation of an electric field vector as seen from the direction in which the polarized light travels is right-handed (i.e. clockwise). Right-handed circularly polarized light is obtained by placing the slow axis of the λ/4 layer in a position at 45 degrees with respect to the polarizing axis of the linearly polarizing layer as seen from the direction in which the polarized light travels.

The first and second polarizing plates of a liquid crystal display panel according to an embodiment of the present invention may be each independently a circularly polarizing plate (having a retardation of 138 nm) or an elliptically polarizing plate (having a retardation of 70 nm or greater to less than 138 nm). This retardation is a value that is needed in a case where the slow axis of the phase difference layer is placed in a position at 45 degrees with respect to the polarizing axis of the linearly polarizing plate, and the slow axis of the phase difference layer may be placed at an angle other than 45 degrees, as long as the ellipticity is 0.422 or greater. The use of a circularly polarizing plate is highly effective in suppressing the reflection of light having passed through the liquid crystal layer from the viewer's side in a state where no voltage is applied (i.e. in a black display state). The use of an elliptically polarizing plate makes it possible to increase the amount of light (i.e. increase the luminance) that is emitted from the backlight and transmitted through the liquid crystal layer in a state where a voltage is applied (i.e. a white display state). Note, however, that, with a retardation of less than 70 nm (i.e. an ellipticity of less than 0.422), the effect of suppressing the reflection of light coming from the viewer's side becomes too smaller in degree and a decrease in contrast ratio results.

The inventors of the present invention found that configuring a twistedly-aligned liquid crystal layer to satisfy the quasit-lambda condition makes it possible to suppress the reflection of outside light having passed through the liquid crystal layer. Further, the inventors of the present invention also found that the use of an elliptically polarizing plate brings about improvement in display luminance.

In the following, structures of liquid crystal display panels according to embodiments of the present invention are described with reference to the drawings. It should be noted that constituent elements having substantially the same functions are referred to by common reference signs throughout the following drawings and descriptions of such constituent elements may be omitted.

Embodiment 1

A structure of a liquid crystal display panel 100A according to Embodiment 1 of the present invention is described with reference to FIG. 1. Example 1 is directed to a case where the first and second polarizing plates are circularly polarizing plates (having a retardation of 137.5 nm).

FIG. 1(a) is a schematic exploded cross-sectional view of the liquid crystal display panel 100A according to Embodiment 1 of the present invention together with a backlight 50. A liquid crystal display device according to Embodiment 1 of the present invention is a transmissive mode liquid crystal display device including the liquid crystal display panel 100A and the backlight 50. FIG. 1(b) is a schematic cross-sectional view of a part that corresponds to one pixel of a liquid crystal cell 10 of the liquid crystal display panel 100A. FIG. 1(c) is a schematic plan view of a part that corresponds to one pixel of the liquid crystal cell 10.

The liquid crystal display panel 100A includes the liquid crystal cell 10, a first polarizing plate 22A, and a second polarizing plate 24A. The first polarizing plate 22A and the second polarizing plate 24A are both circularly polarizing plates whose retardation is 137.5 nm.

As shown in FIG. 1(b), the liquid crystal cell 10 includes a first substrate 10Sa, a second substrate 10Sb, and a liquid crystal layer 18 provided between the first substrate 10Sa and the second substrate 10Sb. The first substrate 10Sa includes a transparent substrate 12a, a common electrode 14 formed on the transparent substrate 12a, a dielectric layer 15 formed on the common electrode 14, and a pixel electrode 16 formed on the dielectric layer 15. A protective film and an alignment film are formed as needed on a side of the pixel electrode 16 that faces the liquid crystal layer 18. The first substrate 10Sa may also include a thin-film transistor (hereinafter referred to as "TFT") for supplying a display signal voltage to the pixel electrode 16 and a gate bus line and a source bus line via which a signal voltage is supplied to the TFT (both not illustrated). The first substrate 10Sa includes a pair of electrodes that causes a transverse electric field to be generated in the liquid crystal layer 18. Note here that the common electrode 14 and the pixel electrode 16 constitute the pair of electrodes. As shown in FIG. 1(c), the pixel electrode 16 has a plurality of rectangular openings 16a that extend parallel to each other. The liquid crystal cell 10 is an FFS mode liquid crystal cell. The second substrate 10Sb includes a transparent substrate 12b. A color filter layer and an alignment film (both not illustrated) may for example be formed on a side of the transparent substrate 12b that faces the liquid crystal layer 18. An FFS mode liquid crystal display panel according to an embodiment of the present invention is not limited to the illustrated configuration but is widely applicable to publicly-known FFS mode liquid crystal display panels. For example, the positional relationship between the common electrode 14 and the pixel electrode 16 may be reversed.

Although the liquid crystal display panel 100A has no phase difference plates provided between the liquid crystal cell 10 and the first polarizing plate 22A or between the liquid crystal cell 10 and the second polarizing plate 24A, a phase difference plate(s) for compensating for wavelength dispersion of the refractive index of the liquid crystal layer 18 and/or variations in phase difference according to wavelength may for example be provided between the liquid crystal cell 10 and the first polarizing plate 22A on the side of the backlight 50 and/or between the liquid crystal cell 10 and the second polarizing plate 24A on the viewer's side. The liquid crystal display panel 100A according to the embodiment of the present invention causes circularly polarized light or elliptically polarized light whose degree of circular polarization is close to 1 to enter the liquid crystal layer 18 so that outside light coming from the viewer's side is prevented from being reflected by the pixel electrode 16 and the common electrode 14 after passing through the liquid crystal layer 18 and emitted from the liquid crystal display panel 100A toward the viewer. Therefore, it is preferable that the phase difference plate that is placed on the viewer's side of the liquid crystal layer 18 prevent circularly polarized light or elliptically polarized light whose degree of circular polarization is close to 1 from becoming lower in degree of circular polarization after passing through the second polarizing plate 24A.

A relationship between the aforementioned quasi-lambda condition, twist angle, etc. and a reflection suppression effect and transmittance was studied by simulation. The simulation involved the use of liquid crystal cells 10 each configured as follows:

The width S of each of the openings 16a was 5 μm. The distance L between openings 16a and the distance L between an opening 16a and an edge of the pixel electrode 16 were 3 μm. This made a slit structure whose L/S was 3 μm/5 μm. The birefringent index Δn and dielectric constant Δε of the negatively dielectrically anisotropic nematic liquid crystal material constituting the liquid crystal layer 18 were 0.12 and −7, respectively. Δnd of the liquid crystal layer 18 was adjusted by varying the thickness (also referred to as "cell thickness") of the liquid crystal layer 18. The thickness and relative dielectric constant of the dielectric layer 15 were 100 nm and 6, respectively. The simulation was done by using an LCD Master 2-D (manufactured by SHINTECH, Inc.).

Figure 2:
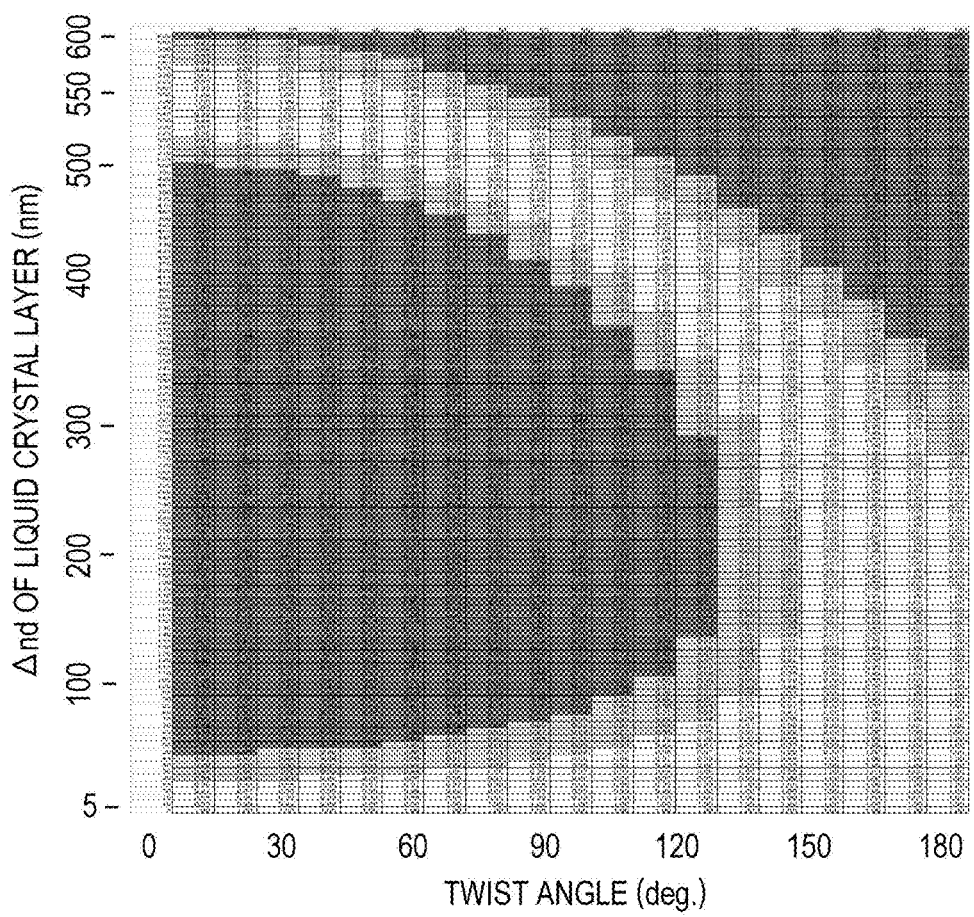
FIG. 2 is a diagram (referred to as "FOM") showing a relationship between the twist angles of liquid crystal layers, Δnd of the liquid crystal layers, and S3 of polarized light having passed through the liquid crystal layers when polarized light whose Stokes parameter S3 is 1.00 entered the liquid crystal layers, the white region indicating a region of 1.00≥S3≥0.95 (E region), the gray region indicating a region of 0.95>S3≥0.85 (G region), and the black region indicating a region of 0.85>S3 (NG region).

FIG. 2 shows a simulation result. FIG. 2 is a diagram showing a relationship between the twist angles of liquid crystal layers, Δnd of the liquid crystal layers, and S3 of polarized light having passed through the liquid crystal layers when polarized light whose Stokes parameter S3 is 1.00 entered the liquid crystal layers. This diagram is referred to as "FOM (figure of merit)". In this FOM, the white region indicates a region in which S3 of the polarized light having passed through the liquid crystal layer satisfies 1.00≥S3≥0.95 (E region), the gray region indicates a region in which S3 satisfies 0.95>S3≥0.85 (G region), and the black region indicates a region in which S3 satisfies 0.85>S3 (NG region). Although a region in which the quasi-lambda condition is satisfied is a region in which the twist angle exceeds 0 degree (that is, the liquid crystal layer is in a twist alignment state), Δnd≈550 nm, and S=1.00, the quasi-lambda condition is substantially satisfied in the E region (white region) and the G region (gray region), too. It should be noted that the lambda condition is at the point where the twist angle is 0 degree and Δnd is 550 nm.

Figure 3:
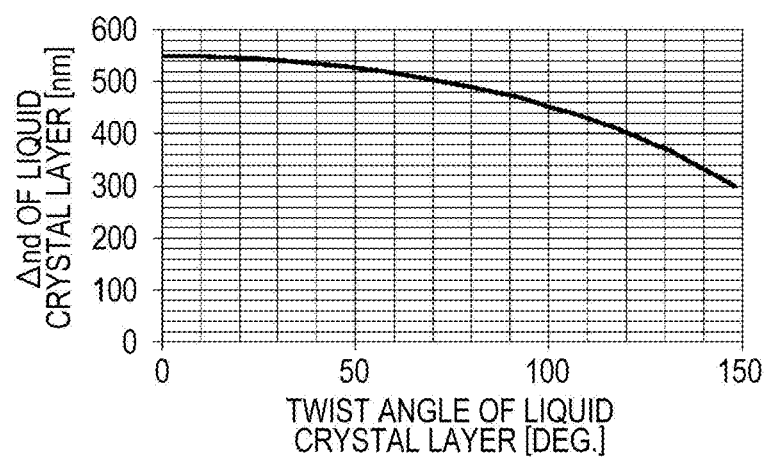
FIG. 3 is a graph showing a relationship between the twist angle of a liquid crystal layer and Δnd of the liquid crystal layer in which S3 of polarized light having passed through the liquid crystal layer is 1.00.

Further, FIG. 3 shows an ideal quasi-lambda condition in the FOM in which S3 of polarized light having passed through a liquid crystal layer is 1.00. The ideal quasi-lambda condition shown in FIG. 3 is expressed by $\Delta nd \approx -0.0134 \cdot \theta^2 + 0.414 \cdot \theta + 544$.

Furthermore, FIGS. 4A to 4D enlarge the FOM shown in FIG. 2 to show numerical values of S3 of polarized light having passed through the liquid crystal layers. FIG. 4A is a diagram showing the values of S3 at which the twist angle falls within a range of 0 degree or greater to 90 degrees or less (in 10-degree increments) and Δnd falls within a range of 310 nm or greater to 600 nm or less (in 5-nm increments). FIG. 4B is a diagram showing the values of S3 at which the twist angle falls within a range of 100 degrees or greater to 180 degrees or less (in 10-degree increments) and Δnd falls within a range of 310 nm or greater to 600 nm or less (in 5-nm increments). FIG. 4C is a diagram showing the values of S3 at which the twist angle falls within a range of 0 degree or greater to 90 degrees or less (in 10-degree increments) and Δnd falls within a range of 5 nm or greater to 305 nm or less (in 5-nm increments). FIG. 4D is a diagram showing the values of S3 at which the twist angle falls within a range of 100 degrees or greater to 180 degrees or less (in 10-degree increments) and Δnd falls within a range of 5 nm or greater to 305 nm or less (in 5-nm increments).

First, as can be seen from FIG. 2, the quasi-lambda condition is satisfied in a limited but unexpectedly wide region. Further, as the twist angle becomes greater, the value of Δnd that satisfies the quasi-lambda condition becomes smaller and the range of Δnd becomes wider. Since Δnd depends on the thickness of the liquid crystal layer, Δnd is affected by manufacturing variations. In view of manufacturing margins, it is preferable that the twist angle be greater.

The closer the numerical values of S3 of polarized light having passed through the liquid crystal layers, shown in FIG. 2 and FIGS. 4A to 4D, are to 1.00, the closer the polarized light having passed through the liquid crystal layers is to circularly polarized light and, therefore, the larger the effect of suppressing the reflection of light (reversal of the direction of rotation of the circularly polarized light) on the first substrates 10Sa becomes in degree. Therefore, to improve black display quality, it is preferable that regions in which the numerical values of S3 of the polarized light having passed through the liquid crystal layers are close to 1.00 be selected.

Table 1 shows the results of calculation of the transmittances of liquid crystal display panels of Examples 1-1 to 1-10, whose liquid crystal layers differ in Δnd and twist angle θ from one another. The term "transmittance" here refers to a transmittance that corresponds to a white display state, as obtained when a voltage of 5 V is applied between the pair of electrodes (i.e. the common electrode 14 and the pixel electrode 16) that generates a transverse electric field. Unless otherwise noted, the same applies below.

Table 1 also shows the results of Comparative Examples 1-1 and 1-2, which satisfy the lambda condition at a twist angle of 0 degree. Comparative Example 1-1 is an example in which a positive nematic liquid crystal whose dielectric anisotropy is positive was used, and Comparative Example 1-2 is an example in which a negative nematic liquid crystal whose dielectric anisotropy is negative was used. Therefore, Comparative Examples 1-1 and 1-2 differ from each other in terms of a relationship between the direction of alignment of a liquid crystal molecule (direction of the major axis of a molecule) and the azimuthal direction of a transverse electric field. It should be noted that liquid crystal display panels that are equivalent to Comparative Examples 1-1 and 1-2 are not publicly known.

In the following, directions (azimuthal directions) such as the direction of alignment and direction of polarization of a liquid crystal molecule are herein expressed by azimuth angles with reference to the azimuthal direction of a transverse electric field. Assuming that the azimuthal direction of a transverse electric field (direction of 3 o'clock on the face of a clock) is 0 degree, the counterclockwise direction as seen from the viewer's side is positive. Twist alignment is defined by the azimuthal direction of alignment of the major axis of a liquid crystal molecule near the lower substrate (first substrate 10Sa) and the azimuthal direction of alignment of the major axis of a liquid crystal molecule near the upper substrate (second substrate 10Sb).

TABLE 1

|  | Liquid Crystal Layer Δnd | Cell Thickness d (μm) | Liquid Crystal Δn | Lower-Substrate Alignment Azimuthal Direction (deg.) | Upper-Substrate Alignment Azimuthal Direction (deg.) | Twist Angle (deg.) | Polarizing Plate Retardation | Transmittance (%) |
|---|---|---|---|---|---|---|---|---|
| Example 1-1 | 540 nm | 4.50 | 0.12 | −11.5 | 21.5 | 33 | 137.5 nm | 22.7 |
| Example 1-2 | 520 nm | 4.33 | 0.12 | −23.5 | 33.5 | 57 | 137.5 nm | 23.2 |
| Example 1-3 | 500 nm | 4.17 | 0.12 | −31.5 | 41.5 | 73 | 137.5 nm | 23.0 |
| Example 1-4 | 480 nm | 4.00 | 0.12 | −38.0 | 48.0 | 86 | 137.5 nm | 22.4 |
| Example 1-5 | 460 nm | 3.83 | 0.12 | −43.5 | 53.5 | 97 | 137.5 nm | 21.5 |
| Example 1-6 | 440 nm | 3.67 | 0.12 | −48.0 | 58.0 | 106 | 137.5 nm | 20.4 |
| Example 1-7 | 420 nm | 3.50 | 0.12 | −52.0 | 62.0 | 114 | 137.5 nm | 19.2 |
| Example 1-8 | 400 nm | 3.33 | 0.12 | −55.5 | 65.5 | 121 | 137.5 nm | 17.9 |

TABLE 1-continued

|  | Liquid Crystal Layer Δnd | Cell Thickness d (μm) | Liquid Crystal Δn | Lower-Substrate Alignment Azimuthal Direction (deg.) | Upper-Substrate Alignment Azimuthal Direction (deg.) | Twist Angle (deg.) | Polarizing Plate Retardation | Transmittance (%) |
|---|---|---|---|---|---|---|---|---|
| Example 1-9 | 380 nm | 3.17 | 0.12 | −58.5 | 68.5 | 127 | 137.5 nm | 16.4 |
| Example 1-10 | 360 nm | 3.00 | 0.12 | −61.5 | 71.5 | 133 | 137.5 nm | 14.8 |
| Comparative Example 1-1 | 550 nm | 4.58 | 0.12 | 85.0 | 85.0 | 0 | 137.5 nm | 6.57 |
| Comparative Example 1-2 | 550 nm | 4.58 | 0.12 | 5.0 | 5.0 | 0 | 137.5 nm | 19.3 |

Figure 5:
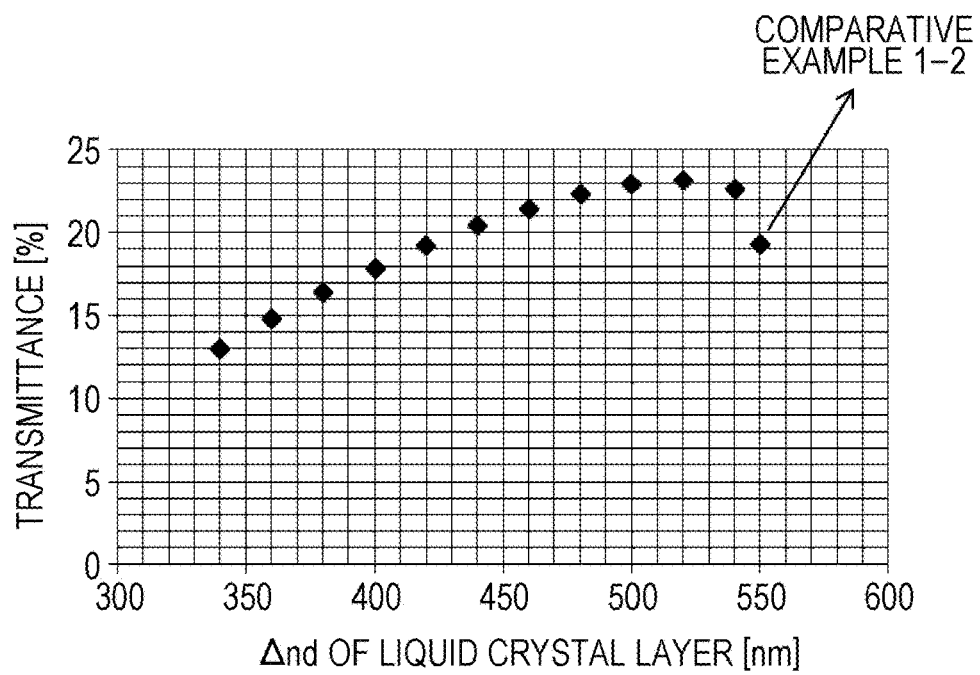
FIG. 5 is a graph showing a relationship between the transmittances of the liquid crystal display panels of Examples 1-1 to 1-10 and Δnd of their liquid crystal layers.

FIG. 5 is a graph showing a relationship between the transmittances of the liquid crystal display panels of Examples 1-1 to 1-10 as shown in Table 1 and Δnd of their liquid crystal layers.

As is clear from FIG. 5, with Δnd of 420 nm or greater, a transmittance (white display luminance) that is higher than that of the liquid crystal display panel of Comparative Example 1-2 can be achieved. As can be seen from FIG. 2, in the range of Δnd of 340 nm or greater to less than 420 nm, the quasi-lambda condition is satisfied in a wide region, although the transmittances are not as high as that of Comparative Example 1-2. That is, there is an advantage of being large in margin with respect to variations in the thicknesses of the liquid crystal layers and able to reduce variations in display quality such as contrast ratio.

Meanwhile, it is preferable that the liquid crystal layer have a twist angle of 50 degrees or greater to less than 90 degrees. In this range of twist angles, Δnd optimally ranges from approximately 480 nm to 520 nm, which is a region in which the transmittances are high. Further, since the twist angle is less than 90 degrees, two or more domains that differ in azimuthal direction of twist alignment from each other can be formed in one pixel to improve viewing angle characteristics.

Embodiment 2

Figure 6:
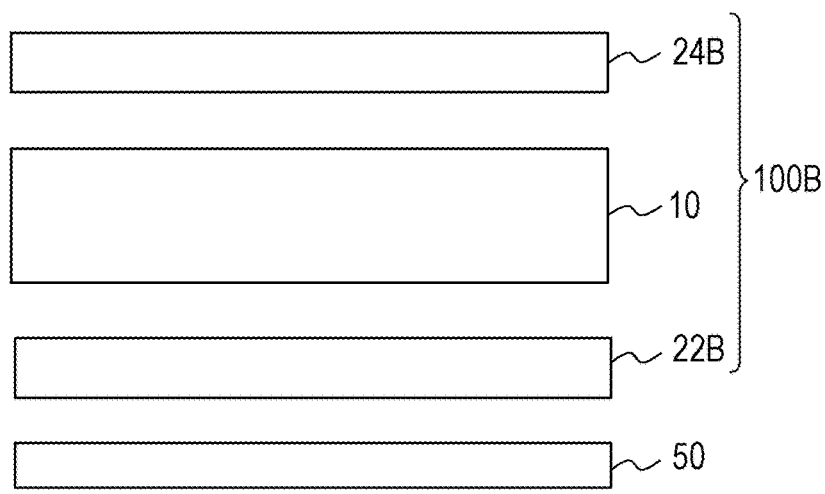
FIG. 6 is a schematic exploded cross-sectional view of a liquid crystal display panel 100B according to Embodiment 2 of the present invention together with a backlight 50.

FIG. 6 is a schematic exploded cross-sectional view of a liquid crystal display panel 100B according to Embodiment 2 of the present invention. The liquid crystal display panel 100B includes a liquid crystal cell 110, a first polarizing plate 22B, and a second polarizing plate 24B. The liquid crystal display panel 100B according to Embodiment 2 differs from the liquid crystal display panel 100A according to Embodiment 1 in that the first polarizing plate 22B and the second polarizing plate 24B are both elliptically polarizing plates (excluding circularly polarizing plates). The other constituent elements of the liquid crystal display panel 100B according to Embodiment 2 are the same as those of the liquid crystal display panel 100A according to Embodiment 1 and, as such, are not described below.

Figure 7:
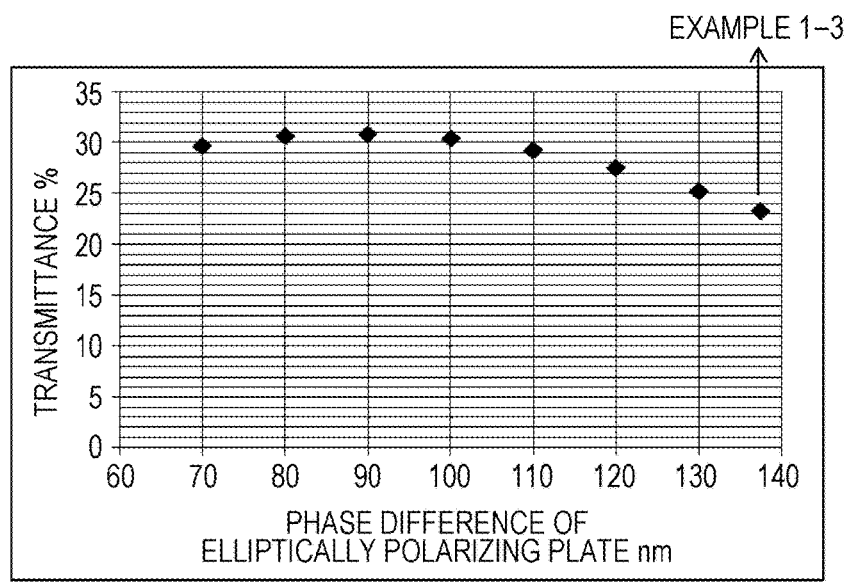
FIG. 7 is a diagram showing a relationship between the phase differences and transmittances of elliptically polarizing plates of liquid crystal display panels whose liquid crystal layers have Δnd of 500 nm and a twist angle of 73 degrees.

Table 2 and FIG. 7 show the results of calculation of transmittances with elliptically polarizing plates having varying retardations (also referred to as "phase differences") of 70 nm to 130 nm in the cases of liquid crystal layers having Δnd of 500 nm and a twist angle of 73 degrees. Table 2 and FIG. 7 also show the result of Example 1-3 (circularly polarizing plates).

TABLE 2

|  | Liquid Crystal Layer Δnd | Cell Thickness d (μm) | Liquid Crystal Δn | Lower-Substrate Alignment Azimuthal Direction (deg.) | Upper-Substrate Alignment Azimuthal Direction (deg.) | Twist Angle (deg.) | Polarizing Plate Retardation | Transmittance (%) |
|---|---|---|---|---|---|---|---|---|
| Example 1-3 | 500 nm | 4.17 | 0.12 | −31.5 | 41.5 | 73 | 137.5 nm | 23.0 |
| Example 2-1 | 500 nm | 4.17 | 0.12 | −31.5 | 41.5 | 73 | 130 nm | 25.3 |
| Example 2-2 | 500 nm | 4.17 | 0.12 | −31.5 | 41.5 | 73 | 120 nm | 27.5 |
| Example 2-3 | 500 nm | 4.17 | 0.12 | −31.5 | 41.5 | 73 | 110 nm | 29.3 |
| Example 2-4 | 500 nm | 4.17 | 0.12 | −31.5 | 41.5 | 73 | 100 nm | 30.4 |
| Example 2-5 | 500 nm | 4.17 | 0.12 | −31.5 | 41.5 | 73 | 90 nm | 30.9 |
| Example 2-6 | 500 nm | 4.17 | 0.12 | −31.5 | 41.5 | 73 | 80 nm | 30.6 |
| Example 2-7 | 500 nm | 4.17 | 0.12 | −31.5 | 41.5 | 73 | 70 nm | 29.7 |

As is clear from Table 2 and FIG. 7, using elliptically polarizing plates instead of circularly polarizing plates can bring about improvement in transmittance. In particular, the transmittances of the liquid crystal display panels of Examples 2-4 to 2-6, whose elliptically polarizing plates had retardations of 80 nm to 100 nm, take on high values exceeding 30%.

As is clear from the above results, replacing circularly polarizing plates with elliptically polarizing plates can bring about improvement in transmittance. However, the use of elliptically polarizing plates reduces the effect of suppressing the reflection of outside light. Given these circumstances, an attempt to optimize the retardation of an elliptically polarizing plate was made in view of the transmittance improvement effect and the effect of suppressing the reflection of outside light.

Figure 8:
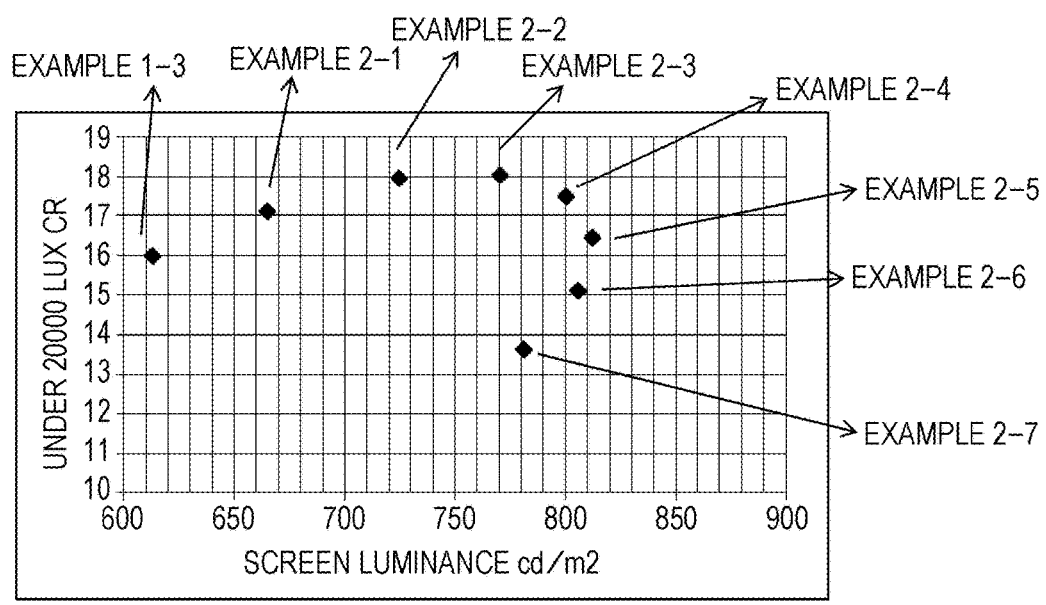
FIG. 8 is a diagram showing a relationship between the screen luminances and contrast ratios (CRs) of liquid crystal display panels whose liquid crystal layers have Δnd of 500 nm and a twist angle of 73 degrees.

FIG. 8 shows a relationship between the screen luminances and contrast ratios (CRs) of liquid crystal display panels whose liquid crystal layers have Δnd of 500 nm and a twist angle of 73 degrees. The contrast ratios were calculated as contrast ratios under 20000 lux on the assumption of lighted outdoor environments.

FIG. 8 shows that, with the elliptically polarizing plates having retardations of 90 nm or greater to 130 nm of less (Examples 2-1 to 2-5), both the luminances and the contrast ratios are higher than those of Example 1-3 (circularly polarizing plates: retardation of 137.5 nm). Further, Examples 2-6 and 2-7, whose elliptically polarizing plates had retardations of 70 nm or greater to 80 nm or less, are lower in contrast ratio but higher in screen luminance than Example 1-3.

It should be noted that in a case where elliptically polarizing plates are used, transmittances vary greatly according to the azimuthal direction of the major axis of elliptically polarized light that enters the liquid crystal layer. Example 2-3, mentioned above, is set in an optimum azimuthal direction.

Figure 9:
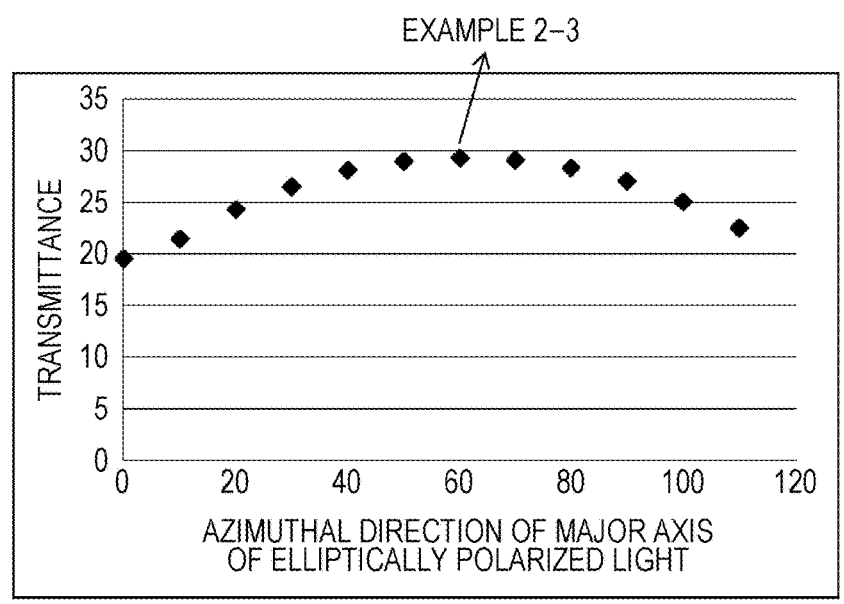
FIG. 9 is a diagram showing a relationship between the azimuthal direction of the major axis of elliptically polarized light with reference to the azimuthal direction of a transverse electric field and the transmittance of the liquid crystal display panel of Example 2-3.

FIG. 9 shows the result of calculation of a relationship between the azimuthal direction of the major axis of incoming elliptically polarized light and the transmittance in cases where elliptically polarizing plates having a retardation of 110 nm were used as in Example 2-3.

As is clear from FIG. 9, transmittances vary according to the azimuthal direction of the major axis of elliptically polarized light. Example 2-3 provides an ideal condition in which the maximum transmittance is attained. The ideal condition is not a must for example in a case where manufacturing limitations are imposed on the axis settings of elliptically polarizing plates, and Example 1-3, which used circularly polarizing plates, can bring about a high-transmittance effect with a transmittance of 23% or higher. FIG. 9 shows that it is preferable that this condition be such that the azimuthal direction of the major axis of elliptically polarized light ranges 20 degrees or greater to 100 degrees or less. In particular, it is more preferable that the azimuthal direction of the major axis of elliptically polarized light be in the range of 60 degrees±10 degrees, which brings about an effect of achieving a large increase in transmittance and an increase in contrast ratio (CR) under 20000 lux.

In each of the liquid crystal display panels 100B of the examples according to Embodiment 2, a phase difference plate (also referred to as "compensation plate") was provided between the liquid crystal cell 10 and the second polarizing plate 24B. The phase difference plate used here was a phase difference plate being equal in Δnd to the liquid crystal layer and having a twisted state twisted in a direction opposite to the twisted state of the liquid crystal layer. This phase difference plate compensates for wavelength dispersion of the refractive index of the liquid crystal layer and variations in phase difference according to wavelength. It should be noted that the phase difference plate may be replaced by a phase different plate having different optical anisotropy. In that case, the azimuthal direction of the major axis of elliptically polarized light at which a high transmittance can be achieved is of course different from those of the above examples. Note, however, that even with use of a phase different plate having different optical anisotropy, the azimuthal direction of the major axis of elliptically polarized light at which the maximum transmittance is attained is present every 180 degrees. Therefore, it is preferable that the azimuthal direction of the major axis of elliptically polarized light fall within the range of ±40 degrees, more preferably ±10 degrees, from the azimuthal direction of the major axis of elliptically polarized light at which the maximum transmittance is attained. Further, a phase difference plate may be provided between the liquid crystal cell 10 and the first polarizing plate 24A. In this case, too, the azimuthal direction of the major axis of elliptically polarized light is of course different from those of the above examples. However, the same relationship as above applies to the preferred range of the major axes of ellipses.

Next, Table 3 shows the result of calculation of the optimum azimuthal direction of the major axis of elliptically polarized light for each of the liquid crystal display panels of Examples 2-10 to 2-19, whose liquid crystal layers differ in Δnd from that of Example 2-3. Further, FIG. 10 shows a relationship between the azimuthal direction of the major axis of elliptically polarized light and the azimuthal direction of alignment of a liquid crystal molecule with reference to the azimuthal direction of a transverse electric field.

In each of the illustrated examples, the major axis of a liquid crystal molecule is twistedly aligned counterclockwise (left-handedly) from the lower substrate toward the upper substrate. Of course, the major axis of a liquid crystal molecule may be twisted clockwise (right-handedly) from the lower substrate toward the upper substrate. In this case, too, the maximum transmittance is attained for example when the azimuthal direction of the major axis of elliptically polarized light is close to being orthogonal to the azimuthal direction of the major axis of a liquid crystal molecule near the lower substrate.

Figure 10:
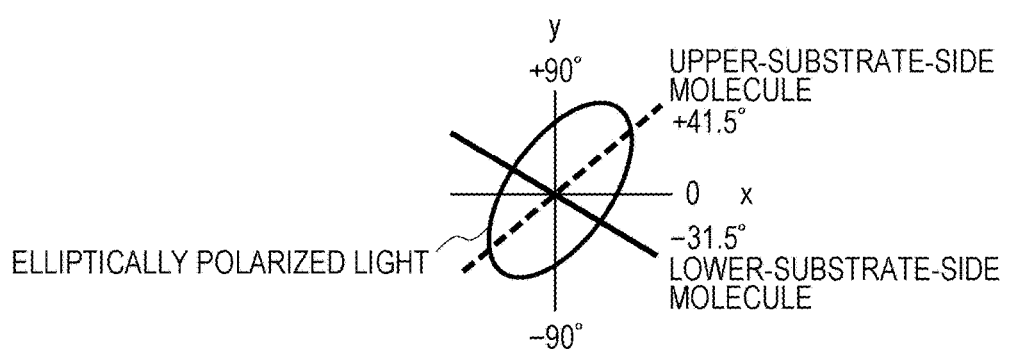
FIG. 10 is a diagram showing a relationship between the azimuthal direction of the major axis of elliptically polarized light and the azimuthal direction of alignment of a liquid crystal molecule with reference to the azimuthal direction of a transverse electric field.

As can be seen from the results shown in FIG. 10 and Table 3, it is preferable that an angle formed by the azimuthal direction of alignment of a liquid crystal molecule near the lower substrate in the liquid crystal layer and the azimuthal direction of the major axis of elliptically polarized light having passed through the first polarizing plate range from 85 degrees or greater to 90 degrees or less.

TABLE 3

|  | Liquid Crystal Layer Δnd | Cell Thickness d (μm) | Liquid Crystal Δn | Lower-Substrate Alignment Azimuthal Direction (deg.) | Upper-Substrate Alignment Azimuthal Direction (deg.) | Twist Angle (deg.) | Polarizing Plate Retardation | Lower Elliptically Polarized Light Major Axis Azimuthal Direction (deg.) |
|---|---|---|---|---|---|---|---|---|
| Example 2-10 | 540 nm | 4.50 | 0.12 | −11.5 | 21.5 | 33 | 110 nm | 81 |
| Example 2-11 | 520 nm | 4.33 | 0.12 | −23.5 | 33.5 | 57 | 110 nm | 68 |
| Example 2-12 | 500 nm | 4.17 | 0.12 | −31.5 | 41.5 | 73 | 110 nm | 60 |
| Example 2-13 | 480 nm | 4.00 | 0.12 | −38.0 | 48.0 | 86 | 110 nm | 55 |
| Example 2-14 | 460 nm | 3.83 | 0.12 | −43.5 | 53.5 | 97 | 110 nm | 50 |
| Example 2-15 | 440 nm | 3.67 | 0.12 | −48.0 | 58.0 | 106 | 110 nm | 46 |
| Example 2-16 | 420 nm | 3.50 | 0.12 | −52.0 | 62.0 | 114 | 110 nm | 42 |
| Example 2-17 | 400 nm | 3.33 | 0.12 | −55.5 | 65.5 | 121 | 110 nm | 39 |
| Example 2-18 | 380 nm | 3.17 | 0.12 | −58.5 | 68.5 | 127 | 110 nm | 34 |
| Example 2-19 | 360 nm | 3.00 | 0.12 | −61.5 | 71.5 | 133 | 110 nm | 31 |

Figure 11:
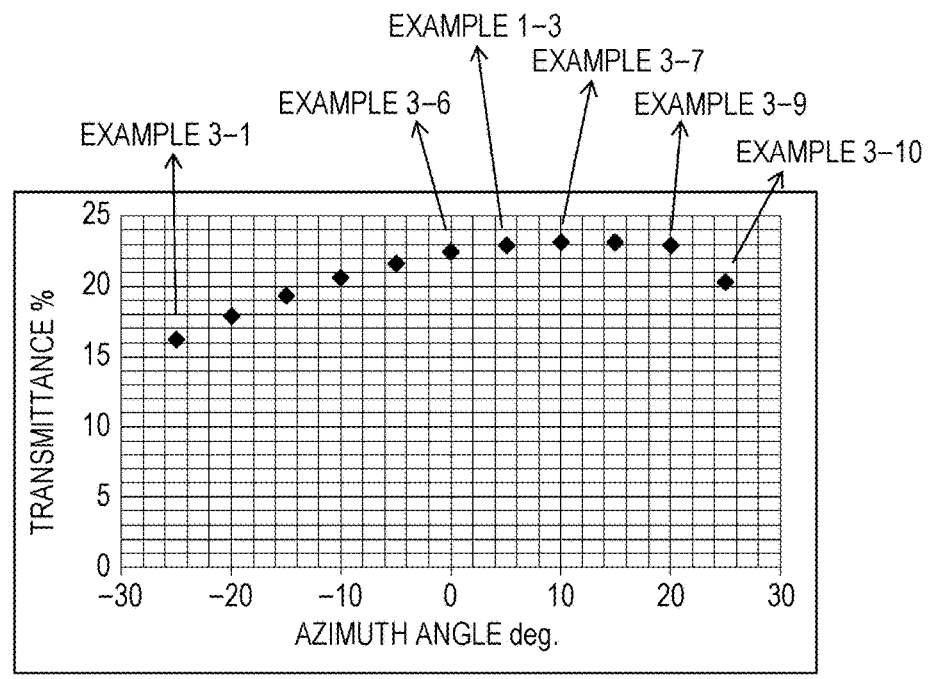
FIG. 11 is a diagram showing a relationship between the azimuthal direction of alignment of a liquid crystal molecule in the center of a thickness direction of the liquid crystal layer with reference to the azimuthal direction of a transverse electric field and the transmittance.

Next, a result of study of a relationship between the twist alignment of a liquid crystal layer and the azimuthal direction of a transverse electric field is shown. Table 4 and FIG. 11 show the results of study of how transmittances vary according to the azimuthal direction of twist alignment with respect to the azimuthal direction of a transverse electric field for the same twist alignment as the twist alignment (twist angle of 73 degrees) of the liquid crystal layer of the liquid crystal display panel of Example 1-3.

Table 4 shows the configurations and transmittances of liquid crystal display panels (Examples 1-3 and Examples 3-1 to 3-10) that differ in azimuthal direction of twist alignment from one another. FIG. 11 is a diagram showing a relationship between the azimuthal direction of alignment of a liquid crystal molecule in the center of a thickness direction of the liquid crystal layer and the transmittance of each of the liquid crystal display panels in the absence of the application of a voltage. It should be noted that the azimuthal direction of alignment of a liquid crystal molecule in the center of the thickness direction of the liquid crystal layer is an azimuthal direction by which the azimuthal direction of alignment of a liquid crystal molecule near the lower substrate and the azimuthal direction of alignment of a liquid crystal molecule near the upper substrate are equally divided from each other.

than the absolute value of the azimuthal direction (positive value) of alignment of a liquid crystal molecule near the upper substrate. Therefore, it is preferable that an angle formed by the azimuthal direction of alignment of a liquid crystal molecule in the center of the thickness direction of the liquid crystal layer and the azimuthal direction of a transverse electric field be greater than 0 degree.

Furthermore, in Example 3-10, in which the azimuthal direction of the major axis of a liquid crystal molecule near the lower substrate is close to the azimuthal direction of a transverse electric field and there are a large number of liquid crystal molecules near the lower substrate that rotate

TABLE 4

| | Liquid Crystal Layer Δnd | Cell Thickness d (μm) | Liquid Crystal Δn | Lower-Substrate Alignment Azimuthal Direction (deg.) | Upper-Substrate Alignment Azimuthal Direction (deg.) | Central Alignment Azimuthal Direction (deg.) | Twist Angle (deg.) | Polarizing Plate Retardation | Transmittance (%) |
|---|---|---|---|---|---|---|---|---|---|
| Example 3-1 | 500 nm | 4.17 | 0.12 | −61.5 | 11.5 | −25 | 73 | 137.5 nm | 16.3 |
| Example 3-2 | 500 nm | 4.17 | 0.12 | −56.5 | 16.5 | −20 | 73 | 137.5 nm | 17.9 |
| Example 3-3 | 500 nm | 4.17 | 0.12 | −51.5 | 21.5 | −15 | 73 | 137.5 nm | 19.4 |
| Example 3-4 | 500 nm | 4.17 | 0.12 | −46.5 | 26.5 | −10 | 73 | 137.5 nm | 20.7 |
| Example 3-5 | 500 nm | 4.17 | 0.12 | −41.5 | 31.5 | −5 | 73 | 137.5 nm | 22.5 |
| Example 3-6 | 500 nm | 4.17 | 0.12 | −36.5 | 36.5 | 0 | 73 | 137.5 nm | 23.2 |
| Example 1-3 | 500 nm | 4.17 | 0.12 | −31.5 | 41.5 | 5 | 73 | 137.5 nm | 23.0 |
| Example 3-7 | 500 nm | 4.17 | 0.12 | −26.5 | 46.5 | 10 | 73 | 137.5 nm | 23.2 |
| Example 3-8 | 500 nm | 4.17 | 0.12 | −21.5 | 51.5 | 15 | 73 | 137.5 nm | 23.0 |
| Example 3-9 | 500 nm | 4.17 | 0.12 | −16.5 | 56.5 | 20 | 73 | 137.5 nm | 23.0 |
| Example 3-10 | 500 nm | 4.17 | 0.12 | −11.5 | 61.5 | 25 | 73 | 137.5 nm | 20.4 |

As can be seen from Table 4 and FIG. 11, transmittances vary according to the azimuthal direction of twist alignment with respect to the azimuthal direction of a transverse electric field, even with the same twist angle of twist alignment.

Figure 12:
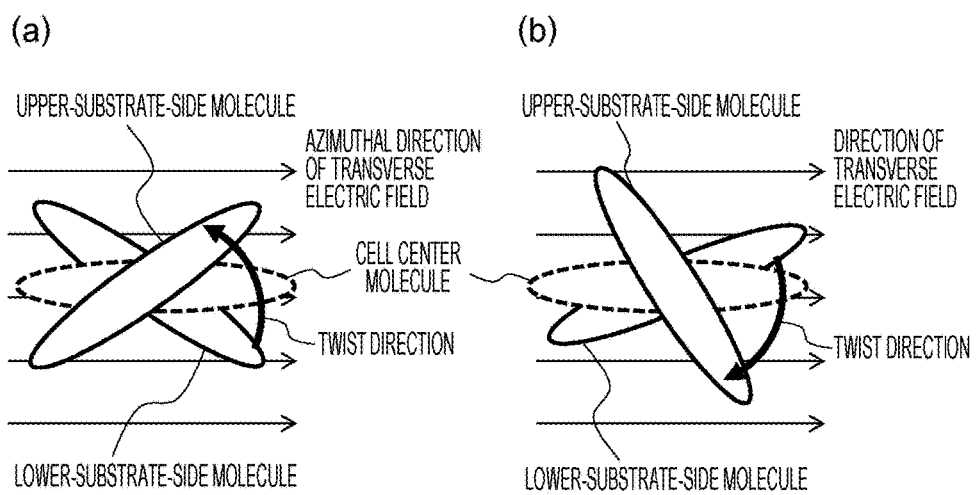
FIG. 12 illustrates diagrams (a) and (b) each schematically showing the appearance of a change in azimuthal direction of alignment of liquid crystal molecules in a transverse electric field, (a) showing a case where the twist direction is counterclockwise (left-handed), (b) showing a case where the twist direction is clockwise (right-handed).

The behavior of liquid crystal molecules in the presence of a transverse electric field in a liquid crystal layer is described with reference to FIG. 12(a). FIG. 12(a) is a diagram schematically showing the appearance of a change in azimuthal direction of alignment of liquid crystal molecules in a transverse electric field and schematically showing the twist alignment of the liquid crystal layer of the liquid crystal display panel of Example 3-6.

In the presence of a transverse electric field as indicated by arrows in FIG. 12(a), a liquid crystal molecule (whose dielectric anisotropy is negative) located closer to the lower substrate than to the center in the thickness direction of the liquid crystal layer is subjected to a force that causes the liquid crystal molecule to rotate clockwise. Meanwhile, a liquid crystal molecule located closer to the upper substrate than to the center in the thickness direction of the liquid crystal layer is subjected to a force that causes the liquid crystal molecule to rotate counterclockwise. However, since a nematic liquid crystal material behaves as a continuous elastic body, the upper-substrate-side liquid crystal molecule rotates clockwise in conformance with the rotation of the lower-substrate-side liquid crystal molecule, which is more strongly subjected to the force generated by the transverse electric field.

Therefore, as can be seen from Table 4 and FIG. 11, a liquid crystal display panel in which a liquid crystal molecule near the lower substrate is aligned in such an azimuthal direction as to be more greatly twisted by a transverse electric field has a high transmittance. That is, a high transmittance is achieved in a case where the absolute value of the azimuthal direction (negative value) of alignment of a liquid crystal molecule near the lower substrate is smaller counterclockwise in the presence of a transverse electric field, the counterclockwise rotation causes the transmittance to become lower, albeit slightly. In particular, it is preferable that the azimuthal direction of alignment of a liquid crystal molecule in the center of the thickness direction of the liquid crystal layer be greater than 0 degree and less than 20 degrees.

Figure 13:
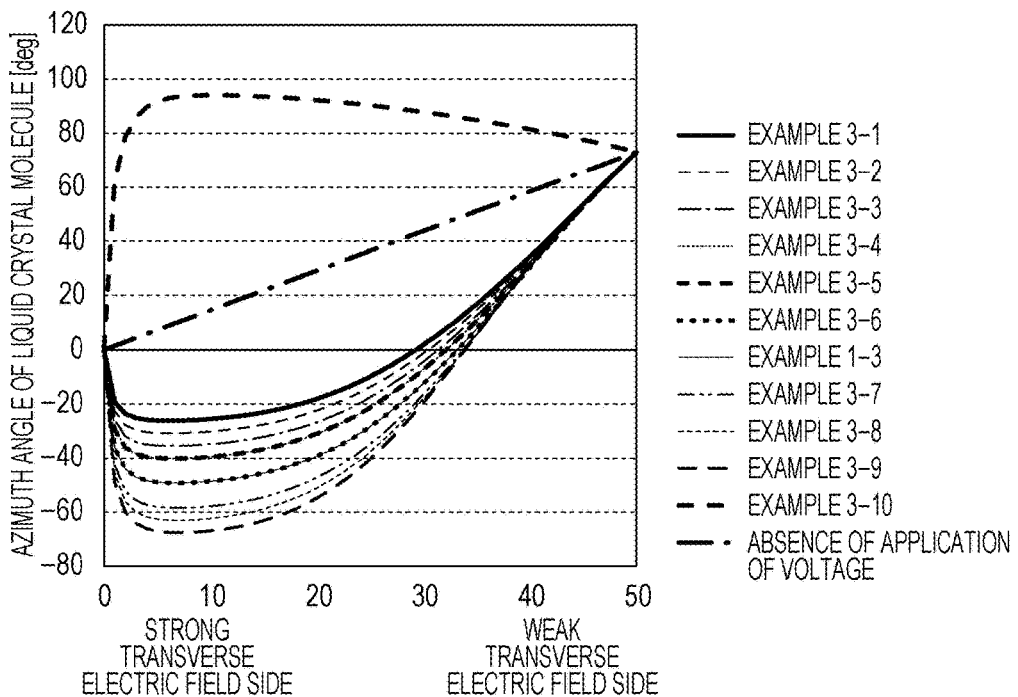
FIG. 13 is a graph showing a distribution of the azimuthal directions of liquid crystal molecules with respect to the azimuthal directions of transverse electric fields in regions where the transverse electric fields are highest in intensity in the liquid crystal layers in the presence of the application of voltages.
Figure 14:
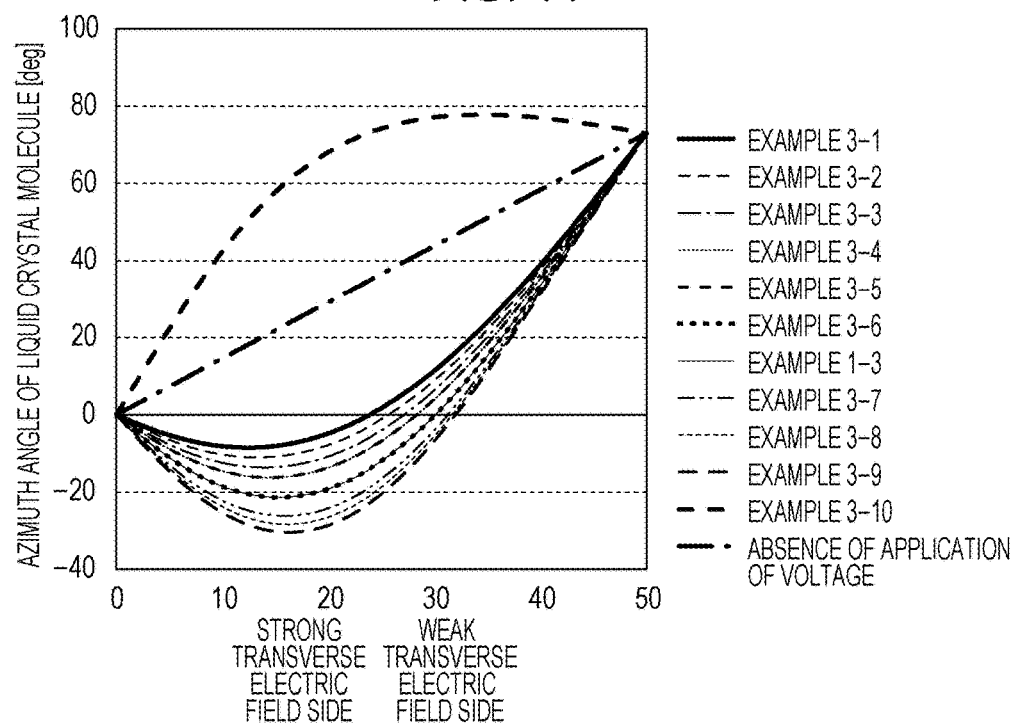
FIG. 14 is a graph showing a distribution of the azimuthal directions of liquid crystal molecules with respect to the azimuthal directions of transverse electric fields in regions where the transverse electric fields are lowest in intensity in the liquid crystal layers in the presence of the application of voltages.

Further, the transverse electric field mode liquid crystal display panels differ in intensity of a transverse electric field in the plane of the liquid crystal layer and therefore also differ in alignment state from one another. FIG. 13 is a graph showing a distribution of the azimuthal directions of liquid crystal molecules with respect to the azimuthal directions of transverse electric fields in regions where the transverse electric fields are highest in intensity in the liquid crystal layers in the presence of the application of voltages. FIG. 14 is a graph showing a distribution of the azimuthal directions of liquid crystal molecules with respect to the azimuthal directions of transverse electric fields in regions where the transverse electric fields are lowest in intensity in the liquid crystal layers in the presence of the application of voltages. Note here that although, as shown in Table 4, Examples 3-1 to 3-10 differ in liquid crystal molecule azimuthal direction in the case of a transverse electric field direction of 0 degree, FIGS. 13 and 14 are plotted such that, for ease of comparison, the azimuthal direction of a liquid crystal molecule on the lower substrate in each of the examples is 0 degree and the azimuthal direction of a liquid crystal molecule on the upper substrate is 73 degrees.

In any case, the twist angle is 73 degrees in the absence of the application of a voltage, but the examples vary in azimuthal direction of alignment on the substrates and, as a result, vary in size of the twist angle in the presence of the application of a voltage. Note here that, as in the case of Example 3-10 (Comparative Example 3-1), with such alignment that the azimuthal direction of the major axis of a liquid crystal molecule near the lower substrate become closer to being parallel to the azimuthal direction of a transverse electric field, a liquid crystal molecule aligned in such an azimuthal direction as to rotate counterclockwise in the presence of a transverse electric field comes to be present even near the lower substrate. In the case of Example 3-10, a force acts to cause a liquid crystal molecule near the lower substrate to rotate clockwise, but there is an increase in the number of liquid crystal molecules that are aligned in such an azimuthal direction as to rotate counterclockwise in the presence of a transverse electric field; therefore, a force generated by the transverse electric field acts on these liquid crystal molecules to cause all liquid crystal molecules to rotate counterclockwise, cause the twist angle to become smaller, and cause the transmittance to become lower. Therefore, as can be seen from Table 4, it is preferable that the azimuthal direction of alignment of a liquid crystal molecule near the lower substrate range from −41.5 degrees or greater to −16.5 degrees or less with respect to the azimuthal direction of a transverse electric field.

It should be noted that although the liquid crystal display panels of the present examples have their liquid crystal layers twistedly aligned counterclockwise (see FIG. 12(a)), in the case of liquid crystal layers twistedly aligned clockwise (see FIG. 12(b)), effects which are similar to those of the present examples can be brought about by causing the azimuthal direction of alignment of the major axis of a liquid crystal molecule to have line symmetry with the direction of a transverse electric field.

The foregoing has described a relationship between the twist alignment of the liquid crystal layer and the azimuthal direction of a transverse electric field in the case of the liquid crystal display panel according to Embodiment 1, i.e. the case where the first polarizing plate 22A and the second polarizing plate 24A are circularly polarizing plates. However, the same relationship applies to the liquid crystal display panel according to Embodiment 2, which uses elliptically polarizing plates. Alternatively, one of the first and second polarizing plates may be a circularly polarizing plate, and the other of the first and second polarizing plates may be an elliptically polarizing plate.

Figure 15:
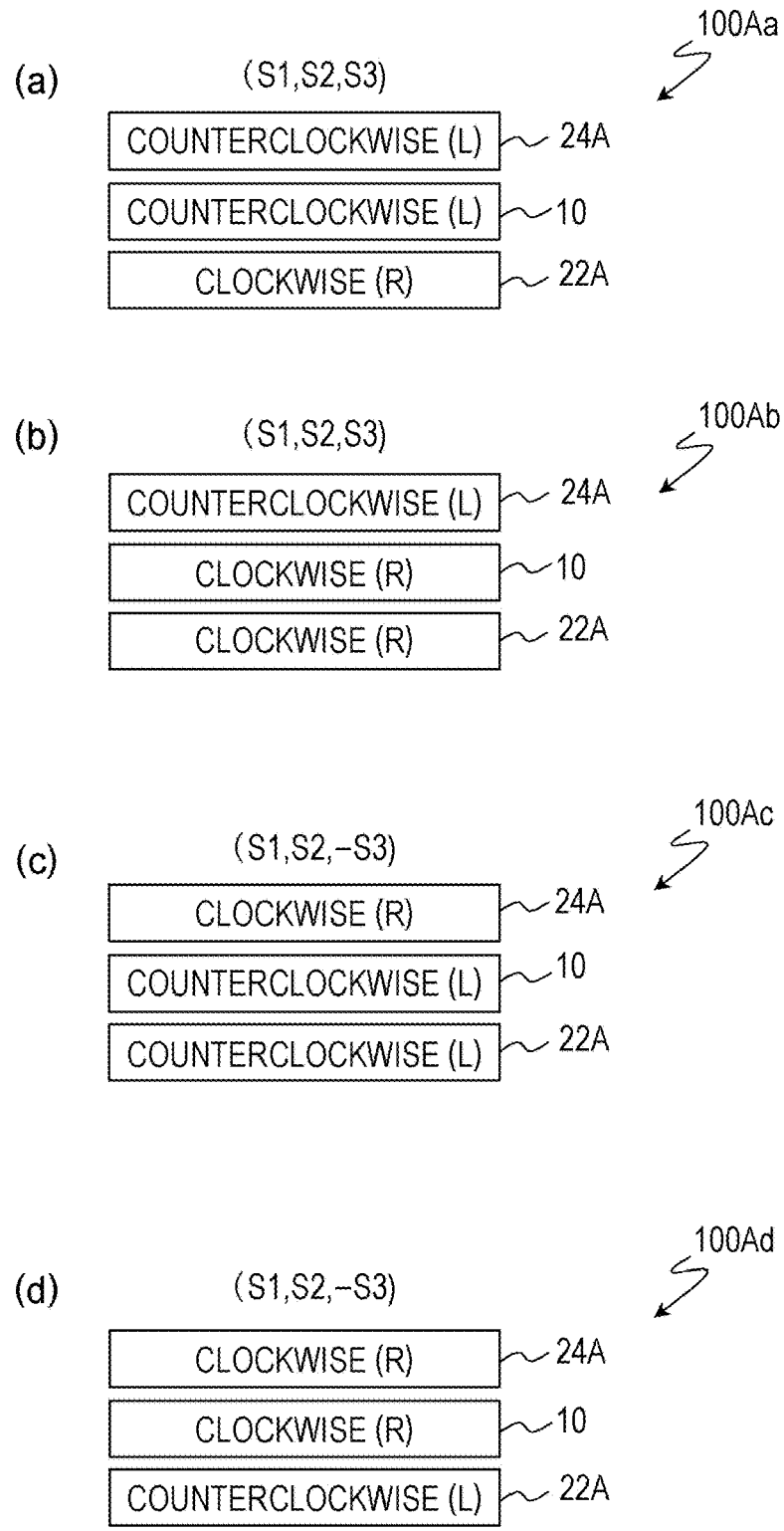
FIG. 15 illustrates schematic views (a) to (d) showing configurations of liquid crystal display panels 100Aa, 100Ab, 100Ac, and 100Ad, respectively, with different combinations of the direction of rotation of circularly polarized light and the twist direction of a liquid crystal layer.

Next, combinations of the direction of rotation of circularly polarized light and the twist direction of a liquid crystal layer are described with reference to FIG. 15.

As with a liquid crystal display panel 100Aa shown in FIG. 15(a), the liquid crystal display panel 100A of Embodiment 1 described above includes a combination of a right-handed (clockwise) first polarizing plate 22A, a liquid crystal cell 10 whose twist direction is left-handed (counterclockwise), and a left-handed (counterclockwise) second polarizing plate 24A. The liquid crystal display panel 100B of Embodiment 2 uses elliptically polarizing plates instead of circularly polarizing plates as the first and second polarizing plates but has the same combination of the direction of rotation of elliptically polarized light and the twist direction of a liquid crystal layer. In addition to this combination of the direction of rotation of circularly polarized light and the twist direction of a liquid crystal layer, there are three other types of combination as shown in FIGS. 15(b) to 15(d). FIGS. 15(b) to 15(d) show the combinations of the direction of rotation of circularly polarized light and the twist direction of a liquid crystal layer in the liquid crystal display panels 100Ab, 100Ac, and 100Ad and the states of polarized light that is emitted from the liquid crystal display panels 100Ab, 100Ac, and 100Ad, respectively, assuming that the Stokes parameter of polarized light that is emitted from the liquid crystal display panel 100Aa is (S1, S2, S3).

The liquid crystal display panel 100Ab shown in FIG. 15(b) is one obtained by changing the twist direction of the liquid crystal layer 10 of the liquid crystal display panel 100Aa to being right-handed (clockwise). The Stokes parameter of polarized light that is emitted from the liquid crystal display panel 100Ab is (S1, S2, S3), which is the same as that of polarized light that is emitted from the liquid crystal display panel 100Aa.

The liquid crystal display panel 100Ac shown in FIG. 15(c) is one obtained by keeping the twist direction of the liquid crystal layer 10 of the liquid crystal display panel 100Aa unchanged (left-handed (counterclockwise), changing the first polarizing plate 22A to being left-handed (counterclockwise), and changing the second polarizing plate 24A to being right-handed (clockwise). The Stokes parameter of polarized light that is emitted from the liquid crystal display panel 100Ac is (S1, S2, −S3), which has point symmetry with that of polarized light that is emitted from the liquid crystal display panel 100Aa with respect to the origin of a Poincaré sphere.

The liquid crystal display panel 100Ad shown in FIG. 15(d) is one obtained by changing the twist direction of the liquid crystal layer 10 of the liquid crystal display panel 100Aa to being right-handed (clockwise), changing the first polarizing plate 22A to being left-handed (counterclockwise), and changing the second polarizing plate 24A to being right-handed (clockwise). The Stokes parameter of polarized light that is emitted from the liquid crystal display panel 100Ad is (S1, S2, −S3), which has point symmetry with that of polarized light that is emitted from the liquid crystal display panel 100Aa with respect to the origin of a Poincaré sphere.

As can be understood from the above, when the first polarizing plate 22A and the second polarizing plate 24A are circularly polarizing plates, all of the liquid crystal display panels 100Ab, 100Ac, and 100Ad are equal in transmittance to the liquid crystal display panel 100Aa. That is, the descriptions of the embodiments and the examples with use of circularly polarizing plates are also valid for the liquid crystal display panels 100Ab, 100Ac, and 100Ad. In a case where the first polarizing plate 22A and the second polarizing plate 24A are replaced by elliptically polarizing plates, it is only necessary to optimize the parameters as described in Embodiment 2.

A liquid crystal display panel according to an embodiment of the present invention may be manufactured by twistedly aligning the liquid crystal molecules of the liquid crystal layer in a predetermined azimuthal direction in a publicly-known method for manufacturing a transverse electric field mode liquid crystal cell. The step of bonding a circularly polarizing plate and/or an elliptically polarizing plate to the liquid crystal cell in a publicly-known method.

The liquid crystal cell 10 (see FIG. 1(b)) of each of the liquid crystal display panels 100A and 100B may be manufactured, for example, in the following manner.

The first substrate 10Sa is fabricated by a publicly-known method. For example, circuit elements such as the TFT, the gate bus line, the source bus line, and a common wire are formed on the glass substrate 12a. After that, the common electrode 14, the dielectric layer 15, and the pixel electrode 16 are formed. An alignment film is formed on a surface of the substrate 10Sa that faces the liquid crystal layer 18. The alignment film is subjected to a rubbing process so that liquid crystal molecules near the first substrate 10Sa align themselves in a predetermined direction.

The second substrate 10Sb is prepared by being fabricated by a publicly-known method. The second substrate 10Sb includes a black matrix, a color filter layer, and an alignment film. The black matrix and the color filter layer are provided, for example, on the glass substrate 12b, and the alignment film is provided on a side that faces the liquid crystal layer 18. The alignment film is subjected to the rubbing process so that liquid crystal molecules near the second substrate 10Sb align themselves in a predetermined direction.

The liquid crystal cell 10 is fabricated, for example, by forming the liquid crystal layer 18 by a drop injection method and bonding the first substrate 10Sa and the second substrate 10Sb to each other while controlling the thickness of the liquid crystal layer 18 with spacers formed in the first substrate 10Sa or the second substrate 10Sb.

Since the liquid crystal layer 18 of a liquid crystal cell 10 of an embodiment of the present invention is in a twist alignment state, variations in display quality according to variations in thickness of the liquid crystal layer are suppressed as mentioned above. Therefore, even with a publicly-known manufacturing method, a liquid crystal display panel of superior display quality can be achieved.

Of course, the process by which the alignment films are aligned is not limited to the rubbing process, but a photo-alignment process may be performed with a photo-alignment film. Alternatively, the rubbing process and the photo-alignment process may be combined.

It is preferable that the TFT of each of the liquid crystal display panels 100A and 100B according to the embodiments of the present invention be a TFT (oxide TFT) including an oxide semiconductor layer, although it may be a publicly-known TFT such an amorphous silicon TFT (a-Si TFT), a polysilicon TFT (p-Si TFT), or a microcrystalline silicon TFT (μC-Si TFT). The use of an oxide TFT allows a reduction in TFT area, and by extension an increase in pixel aperture ratio.

It is preferable that the oxide semiconductor be an In—Ga—Zn—O-based semiconductor (hereinafter abbreviated as "In—Ga—Zn—O semiconductor"), and it is more preferable that the oxide semiconductor be an In—Ga—Zn—O semiconductor including a crystalline portion. Note here that the In—Ga—Zn—O semiconductor is a ternary oxide of In (indium), Ga (gallium), and Zn (zinc) and the proportions (composition ratios) of In, Ga, and Zn are not limited to particular values but include, for example, In:Ga:Zn=2:2:1, In:Ga:Zn=1:1:1, In:Ga:Zn=1:1:2, and the like.

A TFT including an In—Ga—Zn—O semiconductor layer has a high mobility (more than 20 times as high as that of an a-Si TFT) and a low leak current (less than $\frac{1}{100}$ of that of an a-Si TFT) and is therefore suitably usable as a driving TFT as well as a pixel TFT. The use of a TFT including an In—Ga—Zn—O semiconductor layer makes it possible to increase the effective aperture ratio of a display device and reduce the power consumption of the display device.

The In—Ga—Zn—O semiconductor may be amorphous or may be crystalline by including a crystalline portion. A preferred example of a crystalline In—Ga—Zn—O semiconductor is a crystalline In—Ga—Zn—O semiconductor whose c axis is aligned substantially perpendicularly to the layer plane. A crystal structure of such an In—Ga—Zn—O semiconductor is disclosed in Japanese Unexamined Patent Application Publication No. 2012-134475. The entire contents of Japanese Unexamined Patent Application Publication No. 2012-134475 are incorporated herein by reference.

The oxide semiconductor layer may contain another oxide semiconductor instead of the In—Ga—Zn—O semiconductor. For example, the oxide semiconductor layer may contain a Zn—O semiconductor (ZnO), an IN—Zn—O semiconductor (IZO (registered trademark)), a Zn—Ti—O semiconductor (ZTO), a Cd—Ge—O semiconductor, a Cd—Pb—O semiconductor, CdO (cadmium oxide), a Mg—Zn—O semiconductor, an In—Sn—Zn—O semiconductor (e.g. $In_2O_3$—$SnO_2$—ZnO), an In—Ga—Sn—O semiconductor, or the like.

INDUSTRIAL APPLICABILITY

The present invention is widely applicable to transverse electric field mode liquid crystal display panels. In particular, the present invention is suitably applicable to a transverse electric field mode liquid crystal display panel for outdoor use.

REFERENCE SIGNS LIST

10 Liquid crystal cell
10Sa First substrate
10Sb Second substrate
layer 12a, 12b Transparent substrate (glass substrate)
14 Common electrode
15 Dielectric layer
16 Pixel electrode
16a Opening (slit) of pixel electrode)
18 Liquid crystal layer
22A First polarizing plate (circularly polarizing plate)
22B First polarizing plate (elliptically polarizing plate)
24A Second polarizing plate (circularly polarizing plate)
24B Second polarizing plate (elliptically polarizing plate)
50 Backlight
100A, 100B Liquid crystal display panel

The invention claimed is:
1. A liquid crystal display panel comprising:
a liquid crystal cell including a first substrate, a second substrate, and a liquid crystal layer provided between the first substrate and the second substrate;
a first polarizing plate disposed on a back surface side of the liquid crystal cell; and
a second polarizing plate disposed on a viewer's side of the liquid crystal cell, wherein
the first substrate includes a first electrode, a dielectric layer on the first electrode, and a second electrode including openings and being provided on the dielectric layer,
the liquid crystal layer contains a nematic liquid crystal having a negative dielectric anisotropy,
the liquid crystal layer has a Δnd of about 480 nm or greater to about 520 nm or less, where Δn is a birefringent index of the nematic liquid crystal and d is a thickness of the liquid crystal layer,
the liquid crystal layer is in a twist alignment state when no voltage is applied with a twist angle of 50 degrees or greater to less than 90 degrees,
when polarized light with a Stokes parameter of S3 has an absolute value |S3| of 1.00 enters the liquid crystal layer, |S3| of polarized light having perpendicularly passed through the liquid crystal layer is 0.85 or greater,
the first polarizing plate and the second polarizing plate are circularly polarizing plates or elliptically polarizing plates with an ellipticity of 0.422 or greater, and
an angle defined by an azimuthal direction of alignment of a liquid crystal molecule in a center of a thickness direction of the liquid crystal layer and an azimuthal direction of a transverse electric field is greater than 0 degrees and less than 20 degrees.

2. The liquid crystal display panel according to claim 1, wherein |S3| of the polarized light having perpendicularly passed through the liquid crystal layer is 0.95 or greater.

3. The liquid crystal display panel according to claim 1, wherein the first polarizing plate and the second polarizing plate each independently have a retardation of 90 nm or greater to less than 138 nm.

4. The liquid crystal display panel according to claim 1, wherein $\Delta nd$ is approximately given by $-0.0134 \cdot \theta^2 + 0.414 \cdot \theta + 544$, where $\theta$ is the twist angle of the liquid crystal layer in the twist alignment state.

5. The liquid crystal display panel according to claim 1, wherein two or more domains that differ in azimuthal direction of twist alignment from each other are defined in one pixel.

* * * * *